US012474777B2

(12) United States Patent
Roth et al.

(10) Patent No.: US 12,474,777 B2
(45) Date of Patent: Nov. 18, 2025

(54) USING BIOMETRIC DATA TO PROVIDE FEEDBACK IN AN EXTENDED REALITY ENVIRONMENT

(71) Applicant: Oura Health Oy, Oulu (FI)

(72) Inventors: Andy Roth, Long Beach, CA (US); Krystle de Mesa, Redwood City, CA (US); Ryan Andonian, Richmond, CA (US); Joshua Van Patter, Portland, OR (US); Morgan Hecht, Brooklyn, NY (US); Sanya Deshpande, New York, NY (US); Maris Alexandra Jameson, Encinitas, CA (US)

(73) Assignee: Oura Health Oy, Oulu (FI)

( * ) Notice: Subject to any disclaimer, the term of this patent is extended or adjusted under 35 U.S.C. 154(b) by 0 days.

(21) Appl. No.: 18/334,603

(22) Filed: Jun. 14, 2023

(65) Prior Publication Data

US 2024/0419244 A1    Dec. 19, 2024

(51) Int. Cl.
*G06F 3/01*    (2006.01)
*A61B 5/00*    (2006.01)
*A61B 5/01*    (2006.01)

(52) U.S. Cl.
CPC .............. *G06F 3/014* (2013.01); *A61B 5/486* (2013.01); *A61B 5/6803* (2013.01); *A61B 5/01* (2013.01)

(58) Field of Classification Search
CPC ....... G06F 3/014; A61B 5/486; A61B 5/6803; A61B 5/01
See application file for complete search history.

(56) References Cited

U.S. PATENT DOCUMENTS

| | | | | |
|---|---|---|---|---|
| 10,943,407 | B1* | 3/2021 | Morgan | G16H 15/00 |
| 11,493,993 | B2* | 11/2022 | Rubin | G06F 3/011 |
| 2007/0100666 | A1* | 5/2007 | Stivoric | G05B 1/01 |
| | | | | 374/E1.002 |
| 2010/0205541 | A1* | 8/2010 | Rapaport | G06Q 30/02 |
| | | | | 715/753 |
| 2014/0063054 | A1* | 3/2014 | Osterhout | G06F 3/011 |
| | | | | 345/633 |
| 2014/0316191 | A1* | 10/2014 | de Zambotti | A61B 5/486 |
| | | | | 600/27 |

(Continued)

FOREIGN PATENT DOCUMENTS

WO    WO-2016189370 A1    12/2016

OTHER PUBLICATIONS

International Search Report and Written Opinion—PCT/US2023/068479—ISA/EPO—Jun. 15, 2023.

*Primary Examiner* — William Lu
(74) *Attorney, Agent, or Firm* — Holland & Hart LLP

(57) ABSTRACT

Methods, systems, and devices for a wearable device are described. An extended reality device may establish a connection with a wearable device, such as directly with the wearable device or via a user device connected with the wearable device. The extended reality device may acquire biometric data from sensors of the wearable device, the biometric data for a user of the extended reality device and the wearable device. The extended reality device may provide feedback to the user by updating an extended reality environment, an extended reality experience, or both. For example, the extended reality device may provide visual feedback, audio feedback, haptic feedback, or any combination thereof.

20 Claims, 11 Drawing Sheets

(56) References Cited

U.S. PATENT DOCUMENTS

| | | | |
|---|---|---|---|
| 2015/0031333 A1* | 1/2015 | Lee | G06F 1/1698 |
| | | | 455/411 |
| 2015/0039443 A1* | 2/2015 | Soon-Shiong | G06Q 30/0269 |
| | | | 705/14.66 |
| 2015/0306340 A1* | 10/2015 | Giap | A61B 6/46 |
| | | | 600/301 |
| 2016/0063883 A1* | 3/2016 | Jeyanandarajan | G09B 7/08 |
| | | | 434/308 |
| 2016/0066827 A1* | 3/2016 | Workman | A61B 5/742 |
| | | | 600/340 |
| 2017/0215745 A1* | 8/2017 | Felix | A61B 5/7225 |
| 2018/0005160 A1* | 1/2018 | Johnson, III | G06Q 10/06398 |
| 2018/0125395 A1* | 5/2018 | Myer | A61B 5/1127 |
| 2018/0256078 A1* | 9/2018 | Vaterlaus | A61B 5/7435 |
| 2019/0130788 A1* | 5/2019 | Seaton | G06F 3/0346 |
| 2019/0222874 A1* | 7/2019 | Jhaveri | H04N 21/44004 |
| 2019/0269328 A1* | 9/2019 | Porges | A61B 5/11 |
| 2019/0295436 A1* | 9/2019 | Rubinstein | A63B 24/0062 |
| 2019/0321583 A1* | 10/2019 | Poltorak | A61M 21/02 |
| 2020/0082735 A1* | 3/2020 | Nel | G06F 3/011 |
| 2020/0253527 A1* | 8/2020 | Ellison | A61B 5/165 |
| 2021/0225505 A1* | 7/2021 | Khare | G06F 11/3089 |
| 2021/0321205 A1* | 10/2021 | Akers | H04R 1/1008 |
| 2021/0345878 A1* | 11/2021 | Khalil | A61B 5/6802 |
| 2022/0101593 A1* | 3/2022 | Rockel | G06F 3/04842 |
| 2022/0101613 A1* | 3/2022 | Rockel | G06F 3/011 |
| 2023/0020039 A1* | 1/2023 | Shin | G06V 40/15 |

* cited by examiner

USING BIOMETRIC DATA TO PROVIDE FEEDBACK IN AN EXTENDED REALITY ENVIRONMENT

FIELD OF TECHNOLOGY

The following relates to wearable devices and data processing, including using biometric data to provide feedback in an extended reality environment.

BACKGROUND

In some examples, a user may participate in an extended reality experience via an extended reality device, an extended reality screen, or an extended reality immersion room. For example, a user may use a headset, glasses, goggles, a screen, gloves, or another extended reality device for visual, audio, and haptic features in the extended reality experience. The extended reality environment may include a virtual reality environment, an augmented reality environment, or both. Some wearable devices may be configured to collect biometric data and/or movement data from users, including temperature data, heart rate data, motion data, and the like. However, the extended reality device may be unable to utilize the collected data to update the extended reality environment.

DETAILED DESCRIPTION

Figure 1:
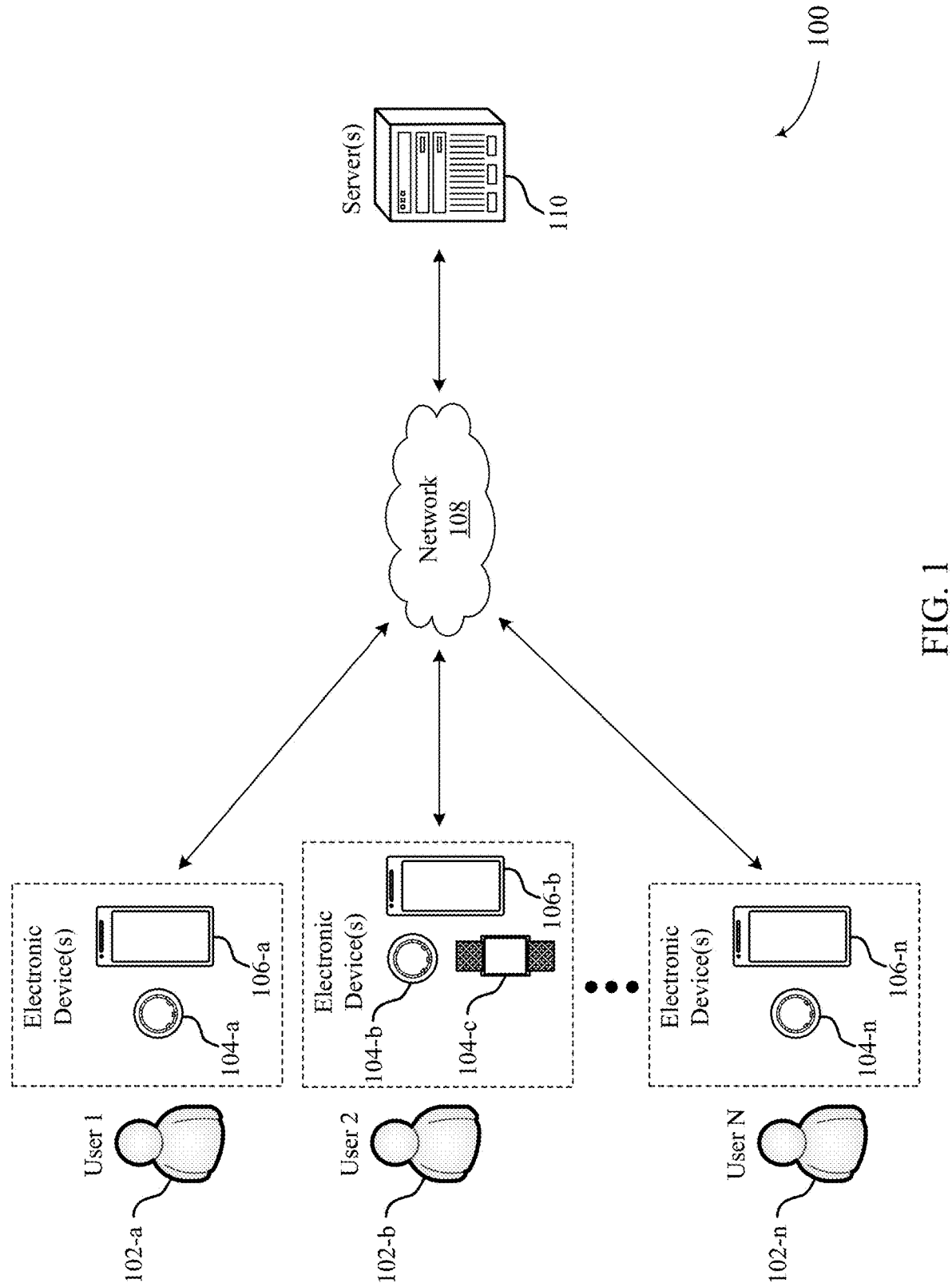
FIGS. 1 through 3 illustrate examples of systems that support using biometric data to provide feedback in an extended reality environment in accordance with aspects of the present disclosure.

Some wearable devices may be configured to collect data from users associated with movement and other activities. For example, some wearable devices may be configured to continuously acquire physiological data associated with a user including temperature data, heart rate data, and the like. As such, some wearable devices may be configured to house one or more sensors configured to acquire physiological data from a user. In some cases, a wearable device may include a flexible printed circuit board (PCB) including electrical circuitry for the one or more sensors. The wearable device may include one or more light sources (e.g., light emitting diodes (LEDs) or other types of light sources) positioned to direct light into a tissue surface of the user and one or more detectors (e.g., photodetectors) positioned to receive the light that passes at least partially through the tissue surface.

A user may participate in an extended reality environment, such as by using an extended reality device for visual, audio, and haptic queues. The extended reality device may include a visual component that provides the user with graphics to view, an audio component that outputs sound to the user, and/or a haptic component that applies pressure to skin of the user. For example, the user may wear a headset, goggles, or glasses that display graphics on a screen, headphones that output sound, or gloves that apply pressure to the hands of the user. However, the extended reality device may be unable to utilize the collected data to update the extended reality environment.

Accordingly, aspects of the present disclosure are directed to using biometric data, movement data, or both to provide feedback to a user in an extended reality environment. For example, a wearable device may establish a wireless connection with a user device and/or an extended reality device. A wearable device may collect or acquire biometric data, movement data, or both from the user interacting in the extended reality environment. The wearable device may send the biometric data to the extended reality device, such as via the user device or via a direct link with the extended reality device. In some cases, the extended reality device may provide feedback to the user, such as visual, audio, and/or haptic feedback, based on a value of the biometric data. For example, if a heart rate of a user is relatively high, then the extended reality device may provide a visual, audio, and/or haptic queue to the user to reduce the heart rate of the user, which may improve the experience of the user in the extended reality environment.

Aspects of the disclosure are initially described in the context of systems supporting physiological data collection from users via wearable devices. Additional aspects of the disclosure are described in the context of example extended reality environment diagrams and process flows. Aspects of the disclosure are further illustrated by and described with reference to apparatus diagrams, system diagrams, and flowcharts that relate to using biometric data to provide feedback in an extended reality environment.

FIG. 1 illustrates an example of a system 100 that supports using biometric data to provide feedback in an extended reality environment in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, blood oxygen saturation (SpO2), blood sugar levels (e.g., glucose metrics), and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-a (User 1) may operate, or may be associated with, a wearable device 104-a (e.g., ring 104-a) and a user device 106-a that may operate as described herein. In this example, the user device 106-a associated with user 102-a may process/store physiological parameters measured by the ring 104-a. Comparatively, a second user 102-b (User 2) may be associated with a ring 104-b, a watch wearable device 104-c (e.g., watch 104-c), and a user device 106-b, where the user device 106-b associated with user 102-b may process/store physiological parameters measured by the ring 104-b and/or the watch 104-c. Moreover, an nth user 102-n (User N) may be associated with an arrangement of electronic devices described herein (e.g., ring 104-n, user device 106-n). In some aspects, wearable devices 104 (e.g., rings 104, watches 104) and other electronic devices may be communicatively coupled to the user devices 106 of the respective users 102 via Bluetooth, Wi-Fi, and other wireless protocols.

In some implementations, the rings 104 (e.g., wearable devices 104) of the system 100 may be configured to collect physiological data from the respective users 102 based on arterial blood flow within the user's finger. In particular, a ring 104 may utilize one or more light-emitting components, such as LEDs (e.g., red LEDs, green LEDs) that emit light on the palm-side of a user's finger to collect physiological data based on arterial blood flow within the user's finger. In general, the terms light-emitting components, light-emitting elements, and like terms, may include, but are not limited to, LEDs, micro LEDs, mini LEDs, laser diodes (LDs) (e.g., vertical cavity surface-emitting lasers (VCSELs), and the like.

In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-a associated with the first user 102-a may be communicatively coupled to the user device 106-a, where the user device 106-a is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time that the user 102 is asleep into one or more sleep stages (e.g., sleep stage classification). For example, as shown in FIG. 1, User 102-a may be associated with a wearable device 104-a (e.g., ring 104-a) and a user device 106-a. In this example, the ring 104-a may collect physiological data associated with the user 102-a, including temperature, heart rate, HRV, respiratory rate, and the like. In some aspects, data collected by the ring 104-a may be input to a machine learning classifier, where the machine learning classifier is configured to determine periods of time that the user 102-a is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-a via a GUI of the user device 106-a. Sleep stage classification may be used to provide feedback to a user 102-a regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-a via the wearable device 104-a. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g., in a hypothetical culture with 12 day "weeks," 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, the respective devices of the system 100 may support techniques for an extended reality device to use biometric data to provide feedback to a user 102. In some cases, a user 102 may participate in an extended reality environment, such as by using extended reality device for visual, audio, and haptic queues. The extended reality device may include a visual component that provides the user 102 with graphics to view, an audio component that outputs sound to the user 102, and/or a haptic component that applies pressure to skin of the user 102. For example, the user 102 may wear a headset, goggles, or glasses that display graphics on a screen, headphones that output sound, and gloves that apply pressure to the hands of the user 102.

In some examples, a wearable device 104 (e.g., a ring 104, a watch wearable device, a necklace wearable device, earring wearable devices, or any other wearable device 104) may establish a wireless connection with a user device 106 and/or an extended reality device. A wearable device 104 may collect or acquire biometric data, movement data, or both from the user 102 interacting in the extended reality environment. The wearable device 104 may send the biometric data to the extended reality device, such as via the user device 106 or via a direct link with the extended reality device. In some cases, the extended reality device may provide feedback to the user 102, such as visual, audio, and/or haptic feedback, based on a value of the biometric data. For example, if a heart rate of a user 102 is relatively high, then the extended reality device may provide a visual, audio, and/or haptic queue to the user 102 to reduce the heart rate of the user, which may improve the experience of the user 102 in the extended reality environment.

It should be appreciated by a person skilled in the art that one or more aspects of the disclosure may be implemented in a system 100 to additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
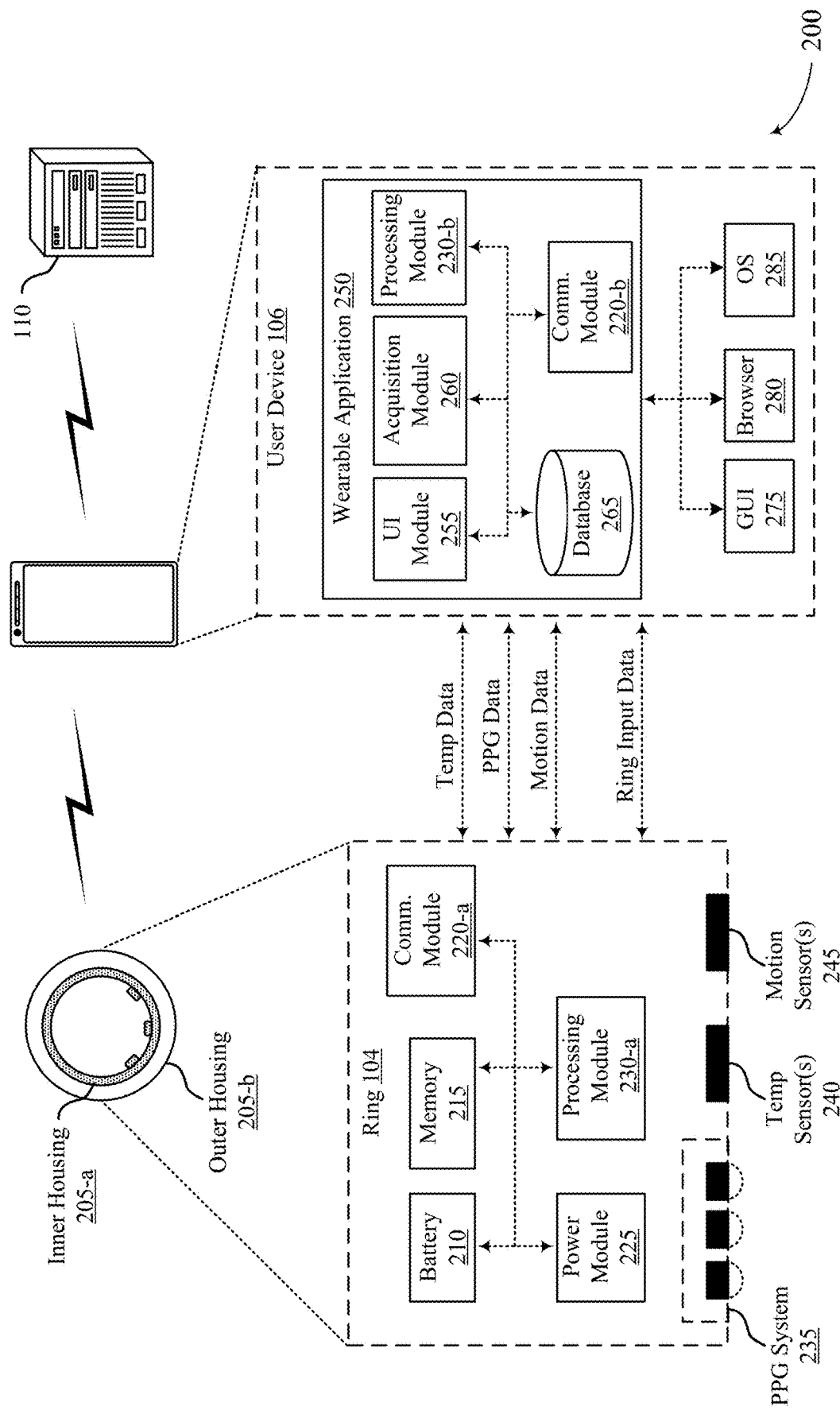

FIG. 2 illustrates an example of a system 200 that supports using biometric data to provide feedback in an extended reality environment in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels (SpO2), blood sugar levels (e.g., glucose metrics), and the like.

The system 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, photoplethysmogram (PPG) data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-a and an outer housing 205-b. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-a, a memory 215, a communication module 220-a, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using a clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-b component (e.g., a shell) and an inner housing 205-a component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-b (e.g., a metal outer housing 205-b). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate(s) from water and/or other chemicals.

The outer housing 205-b may be fabricated from one or more materials. In some implementations, the outer housing 205-b may include a metal, such as titanium, that may provide strength and abrasion resistance at a relatively light weight. The outer housing 205-*b* may also be fabricated from other materials, such polymers. In some implementations, the outer housing 205-*b* may be protective as well as decorative.

The inner housing 205-*a* may be configured to interface with the user's finger. The inner housing 205-*a* may be formed from a polymer (e.g., a medical grade polymer) or other material. In some implementations, the inner housing 205-*a* may be transparent. For example, the inner housing 205-*a* may be transparent to light emitted by the PPG light emitting diodes (LEDs). In some implementations, the inner housing 205-*a* component may be molded onto the outer housing 205-*b*. For example, the inner housing 205-*a* may include a polymer that is molded (e.g., injection molded) to fit into an outer housing 205-*b* metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-*a* of the ring 104 may include one or more processors (e.g., processing units), microcontrollers, digital signal processors, systems on a chip (SOCs), and/or other processing devices. The processing module 230-*a* communicates with the modules included in the ring 104. For example, the processing module 230-*a* may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-*a* may communicate with the memory 215. The memory 215 may include computer-readable instructions that, when executed by the processing module 230-*a*, cause the processing module 230-*a* to perform the various functions attributed to the processing module 230-*a* herein. In some implementations, the processing module 230-*a* (e.g., a microcontroller) may include additional features associated with other modules, such as communication functionality provided by the communication module 220-*a* (e.g., an integrated Bluetooth Low Energy transceiver) and/or additional onboard memory 215.

The communication module 220-*a* may include circuits that provide wireless and/or wired communication with the user device 106 (e.g., communication module 220-*b* of the user device 106). In some implementations, the communication modules 220-*a*, 220-*b* may include wireless communication circuits, such as Bluetooth circuits and/or Wi-Fi circuits. In some implementations, the communication modules 220-*a*, 220-*b* can include wired communication circuits, such as Universal Serial Bus (USB) communication circuits. Using the communication module 220-*a*, the ring 104 and the user device 106 may be configured to communicate with each other. The processing module 230-*a* of the ring may be configured to transmit/receive data to/from the user device 106 via the communication module 220-*a*. Example data may include, but is not limited to, motion data, temperature data, pulse waveforms, heart rate data, HRV data, PPG data, and status updates (e.g., charging status, battery charge level, and/or ring 104 configuration settings). The processing module 230-*a* of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during 104 charging. The power module 225 may also regulate voltage(s) of the device electronics, regulate power output to the device electronics, and monitor the state of charge of the battery 210. In some implementations, the battery 210 may include a protection circuit module (PCM) that protects the battery 210 from high current discharge, over voltage during 104 charging, and under voltage during 104 discharge. The power module 225 may also include electro-static discharge (ESD) protection.

The one or more temperature sensors 240 may be electrically coupled to the processing module 230-a. The temperature sensor 240 may be configured to generate a temperature signal (e.g., temperature data) that indicates a temperature read or sensed by the temperature sensor 240. The processing module 230-a may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-a) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-a may use to determine the temperature. As another example, in cases where the temperature sensor 240 includes a passive sensor, the processing module 230-a (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-a may sample the user's temperature over time. For example, the processing module 230-a may sample the user's temperature according to a sampling rate. An example sampling rate may include one sample per second, although the processing module 230-a may be configured to sample the temperature signal at other sampling rates that are higher or lower than one sample per second. In some implementations, the processing module 230-a may sample the user's temperature continuously throughout the day and night. Sampling at a sufficient rate (e.g., one sample per second) throughout the day may provide sufficient temperature data for analysis described herein.

The processing module 230-a may store the sampled temperature data in memory 215. In some implementations, the processing module 230-a may process the sampled temperature data. For example, the processing module 230-a may determine average temperature values over a period of time. In one example, the processing module 230-a may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, which may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during 104 exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-a near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-a may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-a may sample the sensors at different rates and average/store different values for the different sensors. In some implementations, the processing module 230-a may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-a may sample the PPG signal and determine a user's pulse waveform based on the PPG signal. The processing module 230-a may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 where the optical receiver(s) receive transmitted light that is reflected through the region of the user's finger. In some implementations, the PPG system 235 may be configured as a transmissive PPG system 235 where the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-a may control one or both of the optical transmitters to transmit light while sampling the PPG signal generated by the optical receiver. In some implementations, the processing module 230-a may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-a may store the pulse waveform in memory 215 in some implementations. The processing module 230-a may process the pulse waveform as it is generated and/or from memory 215 to determine user physiological parameters described herein.

The processing module 230-a may determine the user's heart rate based on the pulse waveform. For example, the processing module 230-a may determine heart rate (e.g., in beats per minute) based on the time between peaks in the pulse waveform. The time between peaks may be referred to as an interbeat interval (IBI). The processing module 230-a may store the determined heart rate values and IBI values in memory 215.

The processing module 230-a may determine HRV over time. For example, the processing module 230-a may determine HRV based on the variation in the IBIs. The processing module 230-a may store the HRV values over time in the memory 215. Moreover, the processing module 230-a may determine the user's respiratory rate over time. For example, the processing module 230-a may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-a may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BMI160 inertial micro electro-mechanical system (MEMS) sensor that may measure angular rates and accelerations in three perpendicular axes.

The processing module 230-a may sample the motion signals at a sampling rate (e.g., 50 Hz) and determine the motion of the ring 104 based on the sampled motion signals. For example, the processing module 230-a may sample acceleration signals to determine acceleration of the ring 104. As another example, the processing module 230-a may sample a gyro signal to determine angular motion. In some implementations, the processing module 230-*a* may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-*a* may compress the data stored in memory 215. For example, the processing module 230-*a* may delete sampled data after making calculations based on the sampled data. As another example, the processing module 230-*a* may average data over longer periods of time in order to reduce the number of stored values. In a specific example, if average temperatures for a user over one minute are stored in memory 215, the processing module 230-*a* may calculate average temperatures over a five minute time period for storage, and then subsequently erase the one minute average temperature data. The processing module 230-*a* may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during 104 portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-*b*, a communication module 220-*b*, and a storage module (e.g., database 265) configured to store application data.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the numerical quantity of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the system 200 may support techniques for an extended reality device to use biometric data to provide feedback to a user in an extended reality environment. For example, a wearable device may collect biometric data, such as heart rate data, temperature data, stress data, blood oxygen data, blood glucose data, or any combination thereof using the PPG system 235, the temperature sensors 240, and/or any other sensors of the wearable device. For example, the wearable device may collect heart rate data using the PPG system 235, stress data based on an HRV measured using the PPG system 235, blood oxygen data using the PPG system 235, blood glucose data using the PPG system 235, temperature data using the temperature sensors 240, or any combination thereof. Additionally, or alternatively, the wearable device may collect movement data, such as from one or more motion sensors 245. The wearable device may report the collected data (e.g., the biometric data, the movement data, or both) to an extended reality device, which is described in further detail with respect to FIG. 3.

In some cases, the extended reality device may provide feedback to a user, such as visual, audio, and/or haptic feedback, based on a value of the biometric data. For example, if a heart rate of a user 102 is relatively high, then the extended reality device may provide a visual, audio, and/or haptic cue to the user 102 to reduce the heart rate of the user, which may improve the experience of the user 102 in the extended reality environment as described in further detail with respect to FIG. 4. Additionally, or alternatively, the feedback may include information for a game and/or training experience a user 102 is engaging in via the extended reality environment. For example, the feedback may provide a point value for the user 102, a numerical quantity of lives remaining for the user 102, a strength of an avatar of the user 102, an appearance of the extended reality environment (e.g., visual feedback), or any combination thereof.

Figure 3:
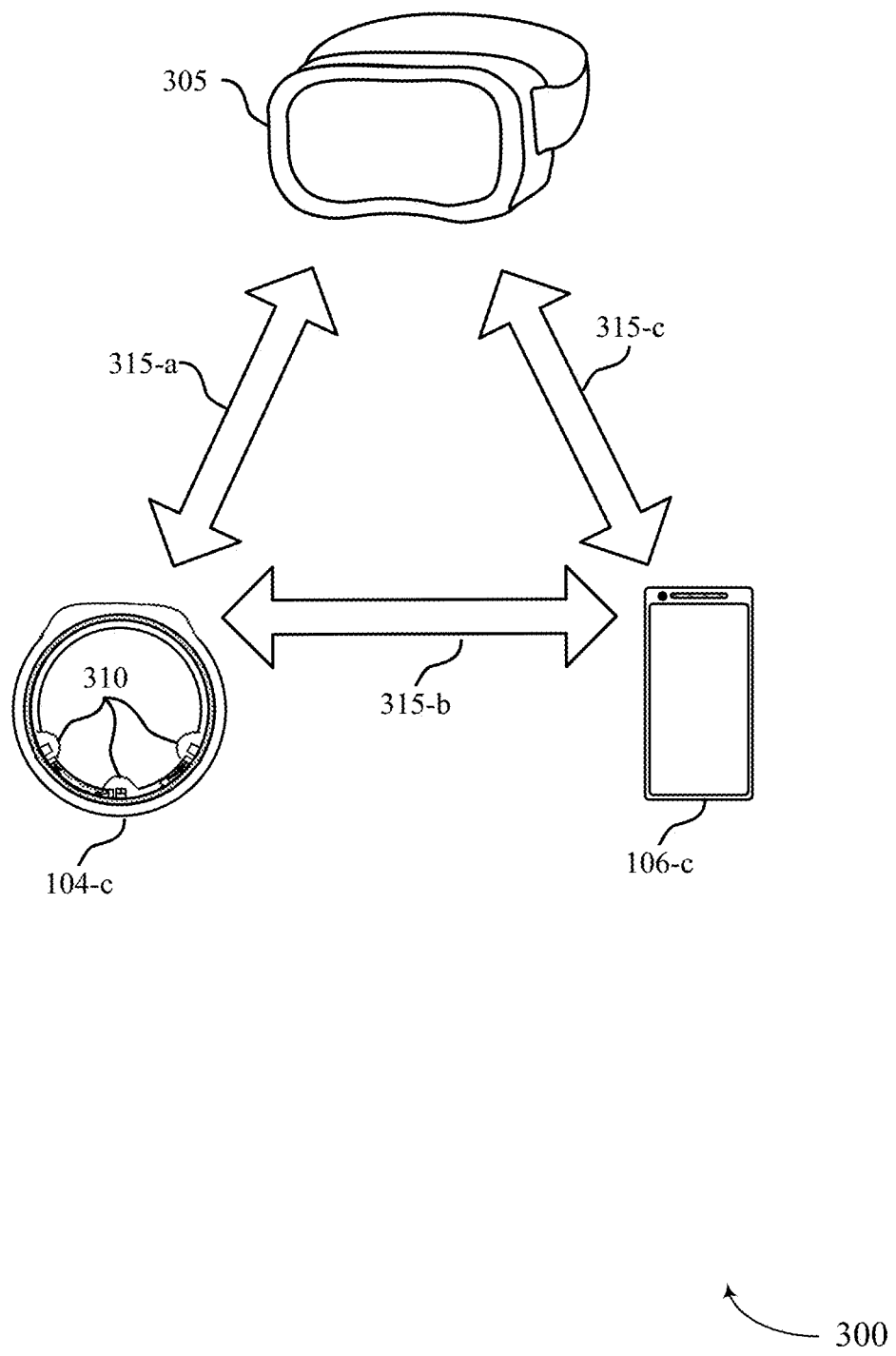

FIG. 3 shows an example of a system 300 that supports using biometric data to provide feedback in an extended reality environment in accordance with aspects of the present disclosure. The system 300 may implement, or be implemented by, aspects of the system 100, the system 200, or both. For example, the system 300 may illustrate an example of communication between a user device 106-c, a wearable device 104-c, and an extended reality device 305, where the user device 106-c and the wearable device 104-c may be examples of the corresponding devices as described with reference to FIGS. 1 and 2.

In some examples, wearable device 104-c may collect one or more biometric measurements of a user via wearable device sensors 310. For example, the biometric measurements may include heart rate data from one or more heart rate sensors, temperature data from one or more temperature sensors, stress data from one or more stress sensors, blood oxygen data from one or more blood oxygen sensors, blood glucose data from one or more blood glucose sensors, or any combination thereof. The wearable device 104-c may also collect movement data via wearable device sensors 310, such as motion of the user using an accelerometer, a gyroscope, or both. The wearable device 104-c may continuously, or periodically, collect data from the user. For example, the wearable device 104-c may collect data in accordance with a defined periodicity, such as according to a defined quantity of seconds, minutes, or any other time period (e.g., every 10 milliseconds, 1 second, or 1 minute). The periodicity may be configured by a user, or may be otherwise defined (e.g., preconfigured) at the wearable device 104-c. Additionally, or alternatively, the user may configure the wearable device 104-c or the wearable device 104-c may be preconfigured to collect data continuously over a duration or continuously while criteria is met. For example, the criteria may be a threshold value for the data that indicates the user is awake.

In some examples, the user may use an extended reality device 305 to participate in an extended reality experience while simultaneously wearing the wearable device 104-c. The extended reality device 305 may support an extended reality environment for the user, which may include a virtual reality environment, an augmented reality environment, or both. In some cases, the user may utilize the extended reality device 305 for gaming, meditation, therapy, education, work, training, or any other extended reality experience. However, the extended reality device 305 may be unable to implement the biometric data, movement data, or both collected by the wearable device 104-c to enhance the user experience in the extended reality environment.

In some examples, the wearable device 104-c may establish a wireless connection (e.g., a Bluetooth connection, a cellular connection, a Wi-Fi connection, or any other wireless connection) with a user device 106-c, an extended reality device 305, or both. Similarly, the user device 106-c may establish a wireless connection with the wearable device 104-c, the extended reality device 305, or both. The wearable device 104-c may transmit signaling including biometric data, movement data, or both to the extended reality device 305 directly via a communications link 315-a. Additionally, or alternatively, the wearable device 104-c may transmit signaling including the biometric data, the movement data, or both to the extended reality device 305 via the user device 106-c using the communications link 315-b and the communications link 315-c. For example, the extended reality device 305 may interface with one or more application programming interfaces (APIs) of the user device 106-c dedicated to obtaining biometric and/or movement information from the wearable device 104-c. In some other examples, the extended reality device 305 may implement one or more APIs dedicated to obtaining biometric and/or movement information from a wearable device 104-c.

The wearable device 104-c may transmit the biometric data, movement data, or both to the extended reality device 305 as the wearable device 104-c collects the data (e.g., continuously or periodically) or after a prompt from the user device 106-c, the extended reality device 305, or both. For example, the extended reality device 305 may determine the biometric data, the movement data, or both is relevant for an extended reality experience (e.g., heart rate data if the user initiates a meditation in the extended reality environment). The extended reality device 305 may transmit a request, or a different type of prompt, to the wearable device 104-c directly via the communications link 315-a, or to the wearable device 104-c via the user device 106-c using the communications link 315-b and the communications link 315-c. In response to the request, the wearable device 104-c may send the biometric data, movement data, or both to the extended reality device 305 (e.g., directly or via the user device 106-c). The request may specify a duration, a frequency, or both for the wearable device 104-c to transmit the biometric data, the movement data, or both. Further, the request may specify a type of data, such as heart rate data, temperature data, respiration rate data, stress data, blood oxygen data, blood glucose data, motion data, or any combination thereof for the wearable device 104-c to collect and/or transmit.

In some cases, the wearable device 104-c may selectively perform one or more measurements for transmitting the biometric data, the movement data, or both, such as in accordance with the request. For example, if the request specifies for the wearable device 104-c to collect and/or transmit heart rate data, the wearable device 104-c may perform heart rate measurements and may suspend one or more other measurement operations (e.g., temperature data, stress data, blood oxygen data, blood glucose data, motion data, or any combination thereof) to conserve energy while performing the heart rate measurements. In some cases, the wearable device 104-c may increase a frequency of one or more measurement operations, such as to provide continuous data to the extended reality device 305, and may suspend or reduce a frequency of other measurement operations to improve battery life.

In some examples, the wearable device 104-*c* may store the biometric data, the movement data, or both for a configured duration in memory. Additionally, or alternatively, the user device 106-*c* and or/the extended reality device 305 may store the biometric data, the movement data, or both for the configured duration in memory. The extended reality device 305 may compare the stored data to current data to determine a trend for a user in an extended reality environment. For example, the extended reality device 305 may compare historical data to current data to determine long term efficacy of an exercise performed by the user (e.g., a mediation to lower a heart rate, a training exercise with a target heart rate or other biometric data value, biometric data during a game played multiple times by the user, or biometric data from any other extended reality experience). If a user participates in a therapy extended reality experience weekly for several months, the extended reality device 305, the wearable device 104-*c*, the user device 106-*c*, or any combination thereof may store the data from each weekly extended reality experience. During each experience, the extended reality device 305 may collect biometric data and provide feedback to the user in accordance with the biometric data.

In some cases, the extended reality device 305 may compare values of the collected biometric data from each extended reality experience, as well as changes in biometric data that occur in response to the feedback (e.g., immediately subsequent to providing the feedback), to determine a long term trend for the user. The extended reality device 305 may report the long term trend to the user, may utilize the long term trend to update the feedback in the extended reality experience (e.g., determine whether the feedback is successfully changing the biometric data of the user, and implement the feedback that is successfully changing the biometric data of the user in future extended reality experiences, among other updates), may utilize the long term trend to update the extended reality experience, or any combination thereof. For example, if a goal of a therapy extended reality experience is to reduce stress of a user, the extended reality device 305 may compare stress biometric data over a time period for multiple extended reality experiences to determine whether a baseline stress value is changing over the time period. The extended reality device 305 may determine whether the therapy extended reality experience is successfully changing the stress biometric data of the user, and may update the content of the therapy extended reality experience accordingly.

Figure 4:
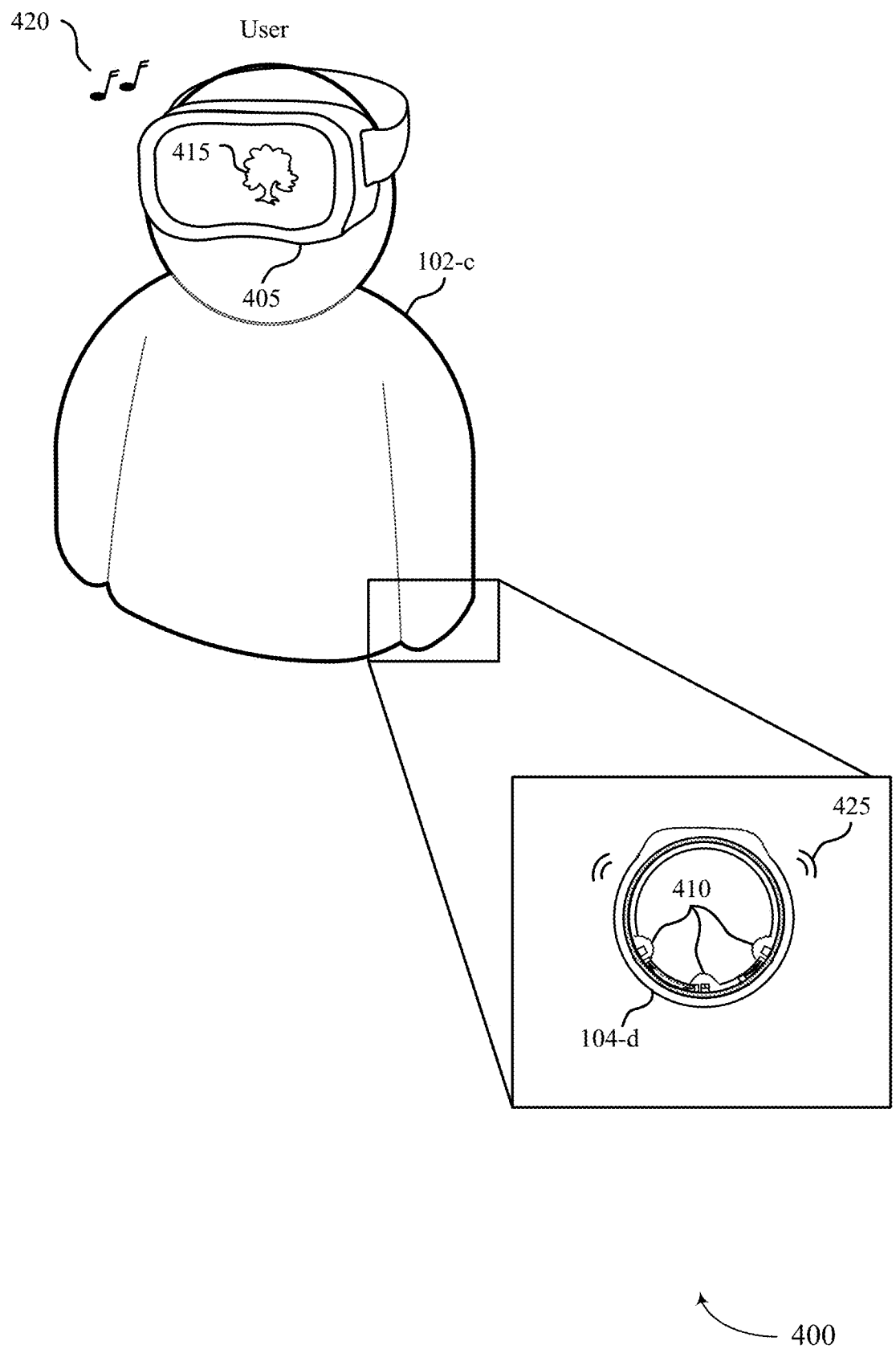
FIG. 4 shows an example of an extended reality environment diagram that supports using biometric data to provide feedback in an extended reality environment in accordance with aspects of the present disclosure.

In some cases, the extended reality device 305 may use the biometric data, the movement data, or both to provide feedback to the user, which is described in further detail with respect to FIG. 4. For example, the extended reality device 305 may provide a visual, verbal, and/or haptic cue to the user to enact a change in heart rate, breathing regularity, body temperature, motion, or the like.

FIG. 4 shows an example of an extended reality environment diagram 400 that supports using biometric data to provide feedback in an extended reality environment in accordance with aspects of the present disclosure. The extended reality environment diagram 400 may implement, or be implemented by, aspects of the system 100, the system 200, the system 300, or any combination thereof. For example, the extended reality environment diagram 400, may illustrate an example of providing feedback to a user 102-*c* using an extended reality device 405 in accordance with biometric data, movement data, or both from a wearable device 104-*d*, where the extended reality device 405 may be an example of an extended reality device 305 as described with reference to FIG. 3, and where the wearable device 104-*d* and the user 102-*c* may be an example of a wearable device 104 and a user 102 as described with reference to FIGS. 1 through 3.

In some examples, the extended reality device 405 may acquire biometric data, movement data, or both from one or more sensors 410 of a wearable device 104-*d* (e.g., directly from the wearable device 104-*d* or via a user device, as described with reference to FIG. 3). For example, the extended reality device 405 may establish a wireless connection with the user device and/or the wearable device 104-*d*. The extended reality device 405 may request the data, may receive the data after establishment of the wireless connection, or both. In some cases, the extended reality device 405 may acquire the biometric data, the movement data, or both if the user 102-*c* initiates an extended reality environment, or experience, that utilizes the data. For example, the user 102-*c* may begin a meditation, a coaching session, a game, or any other experience that utilizes biometric data and/or movement data of a user 102-*c*.

In some examples, the extended reality device 405 may provide feedback to the user 102-*c* using the biometric data and/or the movement data. The feedback may include visual feedback 415, audio feedback 420, haptic feedback 425, or any other feedback that changes the extended reality experience and/or environment for the user 102-*c*. For example, the user 102-*c* may be participating in a meditation experience in the extended reality environment. The wearable device 104-*d* may collect heart rate data using the one or more sensors 410 of the wearable device, which may also be referred to as wearable device sensors, and may send the heart rate data to the extended reality device 405. The extended reality device 405 may update the extended reality experience to provide feedback to the user 102-*c* that causes the heart rate of the user to change accordingly.

In some other examples, the user 102-*c* may be participating in a training experience, in a medical procedure training experience, a mock interview or interrogation experience, in a game experience, or in any other extended reality experience that causes biometric data and/or movement data of a user to change. The extended reality experience may include a target biometric data value and/or a target movement value. The extended reality device 405 may update the extended reality experience to provide feedback to the user 102-*c* that may be intended to cause the heart rate of the user to increase, where a target heart rate value for the user 102-*c* may be relatively low. For example, the extended reality device 405 may display a burning building during a training exercise for a firefighter, may simulate combat for military training, may display an adversary in a game, or the like. The user 102-*c* may attempt to maintain a heart rate value at the target heart rate value regardless of the feedback.

The feedback may include visual feedback 415, such as visual imagery that is intended to change a heart rate of the user. If the intent of the extended reality experience is to reduce a heart rate of the user, such as for a meditation experience, during a medical procedure, or the like, the visual image may be a calming image, such as water flowing, wind blowing through grass or leaves in a tree, rain falling on a sidewalk, or any other calming image. If the intent of the extended reality experience is to change a heart rate of a user to be different than a target heart rate value, such as by increasing the heart rate value for the user, the visual image may be a stress causing image, such as a burning building, an adversary, a combat experience, or any other stressful image. In some examples, to determine which imagery to display, the extended reality device 405 may display a set of images to the user 102-c prior to initiating the extended reality experience, and the user 102-c may select the images for a defined category (e.g., calming, stressing, or any other category). In some other examples, the images may be preconfigured or otherwise defined at the extended reality device 405. Similarly, the visual feedback 415 may be intended to cause another value of the biometric data and/or the movement data to change, such as movement data from one or more motion sensors, temperature data from one or more temperature sensors, stress data from one or more stress sensors, blood oxygen data from one or more blood oxygen sensors, blood glucose data from one or more blood glucose sensors, or any combination thereof.

Additionally, or alternatively, the feedback may include audio feedback 420, such as a noise intended to cause a value of the biometric data, movement data, or both to change. For example, the extended reality device 405 may emit calming music (e.g., selected by the user 102-c or preconfigured at the extended reality device 405), may verbally coach the user, may emit a sound to indicate to the user to engage in the extended reality experience, or may provide any other audio feedback 420 to the user 102-c. In some other examples, the extended reality device 405 may emit stressful music and/or sounds (e.g., selected by the user 102-c or preconfigured at the extended reality device 405), may attempt to verbally guide the user into a state of stress, or may provide any other audio feedback 420 to the user 102-c.

Similarly, the feedback may include haptic feedback 425, such as a vibration by the wearable device 104-d, a vibration or pressure applied by one or more components of the extended reality device 405 (e.g., such as if the user 102-c is wearing gloves in electronic communication with the headset, glasses, or goggles to provide a more immersive extended reality experience), or the like to cause a value of the biometric data, movement data, or both to change. For example, if the user 102-c is participating in a meditation, a training experience, a medical procedure, or any other extended reality experience and a biometric data value satisfies a threshold (e.g., exceeds a threshold, satisfies a target threshold, or any other value) and/or the motion data from the accelerometer indicates that the user 102-c is moving, the extended reality device 405 may trigger the haptic feedback 425 to indicate to the user to remain still, that the biometric data has exceeded a threshold, or the like. The trigger may include a message to the wearable device 104-d directly via a wireless connection between the extended reality device 405 and the wearable device 104-d or via a user device, as described with reference to FIG. 3. In some examples, the haptic feedback 425, the audio feedback 420, the visual feedback 415, or any combination thereof may additionally, or alternatively, occur at a user device.

If the user 102-c is participating in a meditation extended reality experience, and the movement data from the wearable device 104-d indicates that the user 102-c is moving (e.g., motion data satisfies, or exceeds, a threshold value), the extended reality device 405 may display a notification to the user 102-c to remain still, may play a sound to provide audio feedback 420 to the user 102-c that indicates for the user to remain still, may vibrate a component of the extended reality device 405 or vibrate the wearable device 104-d to indicate for the user to remain still, or any combination thereof. Similarly, if the heart rate data, stress data, temperature data, blood oxygen data, blood glucose data, or any combination thereof satisfies a threshold (e.g., is above a threshold or below a threshold), the extended reality device 405 may prompt the user to adjust a breathing rate, a temperature of the ambient environment, adjust a blood glucose value, or the like to improve the extended reality experience. The prompt may be the visual feedback 415, the audio feedback 420, the haptic feedback 425, or any combination thereof. For example, to adjust a breathing rate of the user, the extended reality device 405 may display visual feedback 415, such as a balloon expanding and contracting at the target breathing rate and/or a visual form of a target breathing rate and current breathing rate comparison (e.g., a graph over time).

In some examples, the extended reality device 405 may use the biometric data, the motion data, or both as a controller of the extended reality experience, such as if the extended reality experience is a game. For example, if the user 102-c is participating in a game, the user 102-c may win the game if they reduce their heart rate to a target value. The extended reality device 405 may provide feedback to the user 102-c in the form of features of the game if the user 102-c is unable to achieve the target heart rate. Similarly, the extended reality device 405 may implement the biometric data, the motion data, or both to train a user 102-c to focus and/or block out distractions. If the user 102-c is training for a high-intensity job, the user 102-c may participate in a training experience in which the user 102-c maintains a target value for biometric data, movement data, or both while performing one or more exercises. The exercises may be intended to distract the user 102-c from maintaining the target biometric data, movement data, or both. The extended reality device 405 may provide feedback to the user 102-c if the biometric data, movement data, or both of the user 102-c exceed a threshold value above or below respective targets.

In some cases, the extended reality device 405 may use the biometric data, movement data, or both to increase interest, or focus, in an extended reality experience. For example, the extended reality device 405 may use deviations from a baseline or target expectancy in the biometric data and the movement data to provide feedback to increase interest and/or focus in the extended reality experience, such as a meditation, a training, a medical treatment, therapy, a game, or any other extended reality experience. If the user 102-c is participating in extended reality experience that includes a lesson and/or training, and a heart rate, breathing rate, or both of the user 102-c satisfies a threshold value (e.g., indicating that the user 102-c is asleep), the extended reality device may provide the visual feedback 415, the audio feedback 420, the haptic feedback 425, or any combination thereof to the user 102-c to increase focus in the extended reality experience. For example, the wearable device 104-d may vibrate to wake up the user 102-c.

In some examples, the extended reality device 405 may provide feedback to the user 102-c periodically over a configurable duration. For example, the extended reality device 405 may acquire the biometric data, the movement data, or both from the wearable device 104-d periodically (e.g., a period defined in milliseconds, seconds, minutes, or any other time period). Further, the extended reality device 405 may acquire the biometric data over a configurable duration, such as a set quantity of minutes, hours, days, weeks, months, years, etc., where the user 102-c may set the duration or the duration may be preconfigured. As such, the extended reality device 405 may determine a long term trend of the user 102-c, and how the user 102-c responds to the feedback (e.g., using historical data). Additionally, or alternatively, the extended reality device 405 may provide relatively short-term feedback, such as during an extended reality experience.

In some cases, the extended reality device 405 may acquire additional biometric data, movement data, or both after providing the feedback to the user. For example, the extended reality device 405 may periodically acquire the biometric data, and may update the feedback accordingly. The extended reality device may determine a value of the biometric data remains below or above a target threshold value. For example, if the user 102-*c* is participating in a meditation extended reality experience, the heart rate of the user 102-*c* may continue to exceed a threshold after receiving the feedback. The extended reality device 405 may provide additional visual feedback 415, audio feedback 420, haptic feedback 425, or any combination thereof to the user 102-*c*. For example, the extended reality device 405 may display a reminder to the user 102-*c*, which may indicate for the user 102-*c* to stay still if the motion data continues to exceed a threshold value, may display a calming image if a heart rate continues to exceed a threshold value (e.g., a same calming image or a different calming image), may emit a sound to reduce the heart rate of the user if the heart rate continues to exceed the threshold value, may provide additional haptic feedback 425 to the user 102-*c*, or any combination thereof.

Additionally, or alternatively, the extended reality device 405 may adjust an intensity level of the feedback in accordance with how the user 102-*c* reacts to the feedback. For example, if the user 102-*c* reacts well to the feedback (e.g., a biometric data value, movement data value, or both changes to satisfy a threshold), the extended reality device 405 may provide the user with one or more relatively subtle feedback queues. The subtle feedback queues may include a relatively small, or insignificant, change in a visual image displayed by the extended reality device 405, a relatively quiet noise emitted by the extended reality device 405, or a relatively small vibration by the wearable device 104-*d* or component of the extended reality device 405. In some other examples, if the biometric data value, movement data value, or both of the user 102-*c* change relatively slowly or do not change to satisfy a threshold, the extended reality device 405 may provide the user with one or more relatively intense feedback queues. The relatively intense feedback queues may include a relatively significant change in a visual image displayed by the extended reality device 405, a relatively loud noise emitted by the extended reality device 405, or a relatively large vibration by the wearable device 104-*d* or component of the extended reality device 405.

Figure 5:
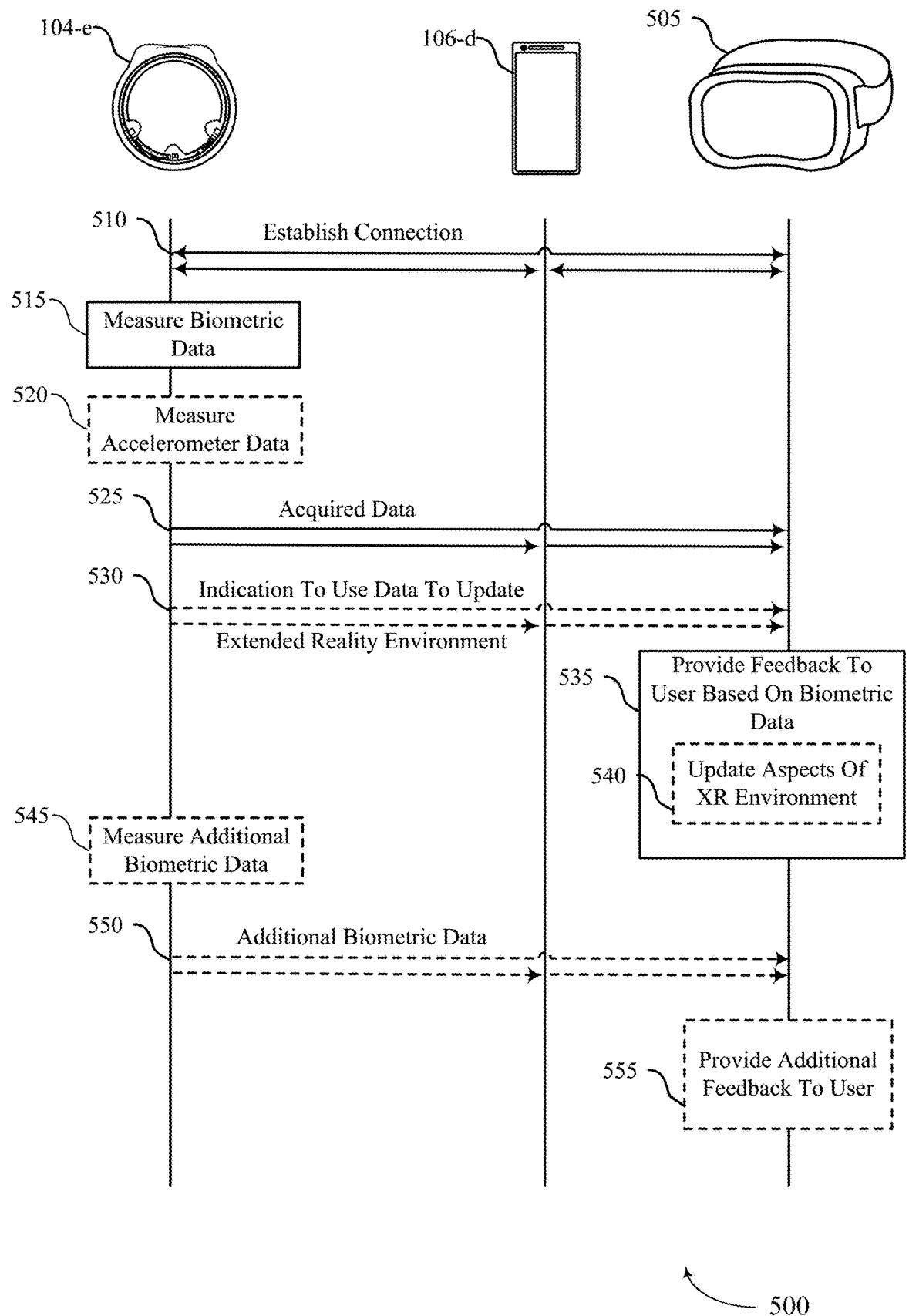
FIG. 5 shows an example of a process flow that supports using biometric data to provide feedback in an extended reality environment in accordance with aspects of the present disclosure.

FIG. 5 shows an example of a process flow 500 that supports using biometric data to provide feedback in an extended reality environment in accordance with aspects of the present disclosure. The process flow 500 may be implemented by aspects of the system 100, the system 200, the system 300, and the extended reality environment diagram 400. For example, the process flow 500 may illustrate an example of a wearable device 104-*e*, a user device 106-*d*, and an extended reality device 505 establishing a connection to provide feedback to a user in accordance with biometric data from the wearable device 104-*e*, where the wearable device 104-*e*, the user device 106-*d*, and the extended reality device 505 may be examples of corresponding devices described herein, including with reference to FIGS. 1 through 4.

In the following description of the process flow 500, the operations may be performed in a different order than the order shown. Specific operations also may be left out of the process flow 500, or other operations may be added to the process flow 500. Further, although some operations or signaling may be shown to occur at different times for discussion purposes, these operations may actually occur at the same time.

In some cases, although the wearable device 104-*e* is illustrated as a ring wearable device, the wearable device 104-*e* may be any example of a wearable device, such as a watch wearable device, a necklace wearable device, a bracelet wearable device, earring wearable devices, an anklet wearable device, chest strap or body-worn device, and the like. Similarly, although the user device 106-*d* is illustrated as a cellular device, the user device 106-*d* may be any example of a user device, such as a smart watch, a laptop computer, or any other user device. The extended reality device 505 may be an example of an extended reality headset, extended reality goggles, extended reality glasses, or any other extended reality device. Further, the extended reality device 505 may include one or more components, such as a headset, glasses, goggles, gloves, a suit, or any other components.

At 510, the wearable device 104-*e* and the extended reality device 505 may establish a wireless connection (e.g., a Bluetooth connection, a Wi-Fi connection, or a cellular connection). In some cases, the wearable device 104-*e* may establish a connection directly with the extended reality device 505. In some other cases, the wearable device 104-*e* may establish a connection with the extended reality device 505 via a user device 106-*d*, as described with reference to FIG. 3.

At 515, the wearable device 104-*e* may perform one or more measurements to obtain biometric data. For example, the wearable device 104-*e* may measure a heart rate, temperature, stress, blood oxygen, blood glucose, or any combination thereof using one or more sensors, as described with reference to FIG. 2. In some examples, the wearable device 104-*e* may perform the measurements based on receiving a request for the biometric data from the user device 106-*d* and/or the extended reality device 505. In some other examples, the wearable device 104-*e* may perform the measurements independent of (e.g., without) receiving a request for the biometric data, such as in accordance with a periodicity. The periodicity may be preconfigured at the wearable device 104-*e*, may be set by the user device 106-*d*, or may be set by the extended reality device 505.

In some cases, the wearable device 104-*e* may update a frequency or duration for performing one or more measurements. The user device 106-*d*, the extended reality device 505, or both may request the biometric data, which may include a request for one or more parameters of the biometric data. For example, the user device 106-*d*, the extended reality device 505, or both may request heart rate data, and the wearable device 104-*e* may maintain or increase a frequency of heart rate measurements over a duration and reduce a frequency of other measurements over the duration to reduce power consumption at the wearable device 104-*e*. The duration may be a preconfigured duration, or may be a duration indicated by the extended reality device 505 (e.g., a duration of an extended reality experience).

In some cases, at 520, the wearable device 104-*e* may measure accelerometer, or gyroscope, data, such as motion of a user.

At 525, the wearable device 104-*e* may transmit the biometric data to the extended reality device 505 (e.g., directly or via the user device 106-*d*). In some cases, the wearable device 104-*e* may also transmit the movement data to the extended reality device 505.

In some examples, at 530, the wearable device 104-*e* may transmit an indication for the extended reality device 505 to use the biometric data, the movement data, or both to update one or more visual aspects, audio aspects, and/or haptic aspects of the extended reality experience or environment, as described with reference to FIG. 4. The one or more visual aspects of the extended reality environment may be configured to cause a parameter of the biometric data to change in accordance with feedback.

At 535, the extended reality device 505 may provide feedback to the user based on the biometric data. The extended reality device 505 may determine one or more values of the biometric data may satisfy a threshold. For example, the extended reality device 505 may determine a heart rate may exceed a target heart rate value for an extended reality environment, temperature value exceeds a target temperature value for an extended reality environment, a stress value exceeds a target stress value for an extended reality environment, a blood oxygen value is above or below a target blood oxygen value, a blood glucose is above or below a target blood glucose value, or any combination thereof. The extended reality device 505 may provide one or more of visual feedback, audio feedback, haptic feedback, or any combination thereof to the user in accordance with determining the biometric data satisfies the threshold.

In some examples, the extended reality device may determine a user is moving based on the movement data satisfying a threshold. The extended reality device may provide an indication to the user to refrain from moving (e.g., a visual display indicating for the user to remain still, an audio prompt for the user to remain still, and/or a haptic prompt for the user to remain still). In some cases, the extended reality device 505 may provide the feedback to the user in accordance with an engagement status of the user. For example, if the user is not engaged, such as if a heart rate of the user satisfies a threshold, movement data of the user satisfies a threshold, or the like, the extended reality device 505 may remind the user to stay engaged using the feedback. In some other examples, if the user is engaged based on the biometric data, the extended reality device 505 may refrain from providing feedback to the user.

In some cases, the extended reality device 505 may provide the feedback to the user via the wearable device 104-e. For example, the extended reality device 505 may trigger a vibration at the wearable device 104-e to provide haptic feedback to the user.

In some examples, the extended reality device 505 may provide the feedback to the user periodically over a configurable duration. For example, the extended reality device 505 may define a duration for an extended reality experience, and may acquire the data and/or provide feedback to the user according to a period for that duration. The extended reality experience may have a relatively short duration, and the period may be measured in milliseconds, seconds, or minutes. Additionally, or alternatively, the extended reality device 505 may define a duration over multiple extended reality experiences, which may be a relatively long-term duration. Thus, the extended reality device 505 may provide the feedback to the user while accounting for long-term trends of how the user responds to the feedback. That is, the extended reality device 505 may track how a user responds to feedback over a duration, such as over multiple days, weeks, months, and/or years. The extended reality device 505 may still collect the data and/or provide feedback according to a period for that duration, where the period may be measured in milliseconds, seconds, or minutes. The user may set the duration, the extended reality device may determine the duration, or the duration may be preconfigured or otherwise defined. Similarly, the user may set the period, the extended reality device may determine the period, or the period may be preconfigured or otherwise defined.

At 540, the extended reality device 505 may update aspects of an extended reality experience or environment in accordance with the biometric data. For example, if the user is performing a meditation in the extended reality environment and a heart rate value exceeds a threshold value, the extended reality device may display an image, may emit a noise, may vibrate the wearable device 104-e or another component of the extended reality device 505, or any combination thereof. The feedback may be in the form of an indication to the user that the heart rate value exceeds the threshold and/or a calming change to the extended reality experience.

At 545, the wearable device 104-e may measure additional biometric data from one or more sensors of the wearable device 104-e. For example, the extended reality device 505 may request additional data. In some other examples, the wearable device 104-e may measure the biometric data periodically, such as over a duration.

In some cases, at 550, the wearable device 104-e may transmit the additional biometric data to the extended reality device 505. The extended reality device 505 may determine a difference between the measured biometric data at 515 and the additional biometric data satisfies a threshold, such as to determine whether the biometric data has changed. That is, in some cases, the extended reality device 505 may determine that a value of the biometric data at 515 is a same, or similar, value as the additional biometric data at 545, and may determine that the biometric data has not changed. In some other cases, the extended reality device 505 may determine that a value of the biometric data at 515 is different than a value of the additional biometric data at 545, and may determine that the biometric data has changed.

At 555, if the biometric data has changed and satisfies a target value for the extended reality environment, then the extended reality device 505 may not provide additional feedback to the user. If the biometric data has not changed and still fails to satisfy a target value for the extended reality environment, then the extended reality device 505 may provide additional feedback to the user. In some cases, the extended reality device 505 may increase an intensity of the reminder (e.g., provide a more urgent image, increase the volume of audio feedback, increase the intensity of the haptic feedback, or any combination thereof) if the biometric data still fails to satisfy a target value for the extended reality environment. Additionally, or alternatively, the extended reality device 505 may provide a reminder of the feedback at 535 to the user.

Figure 6:
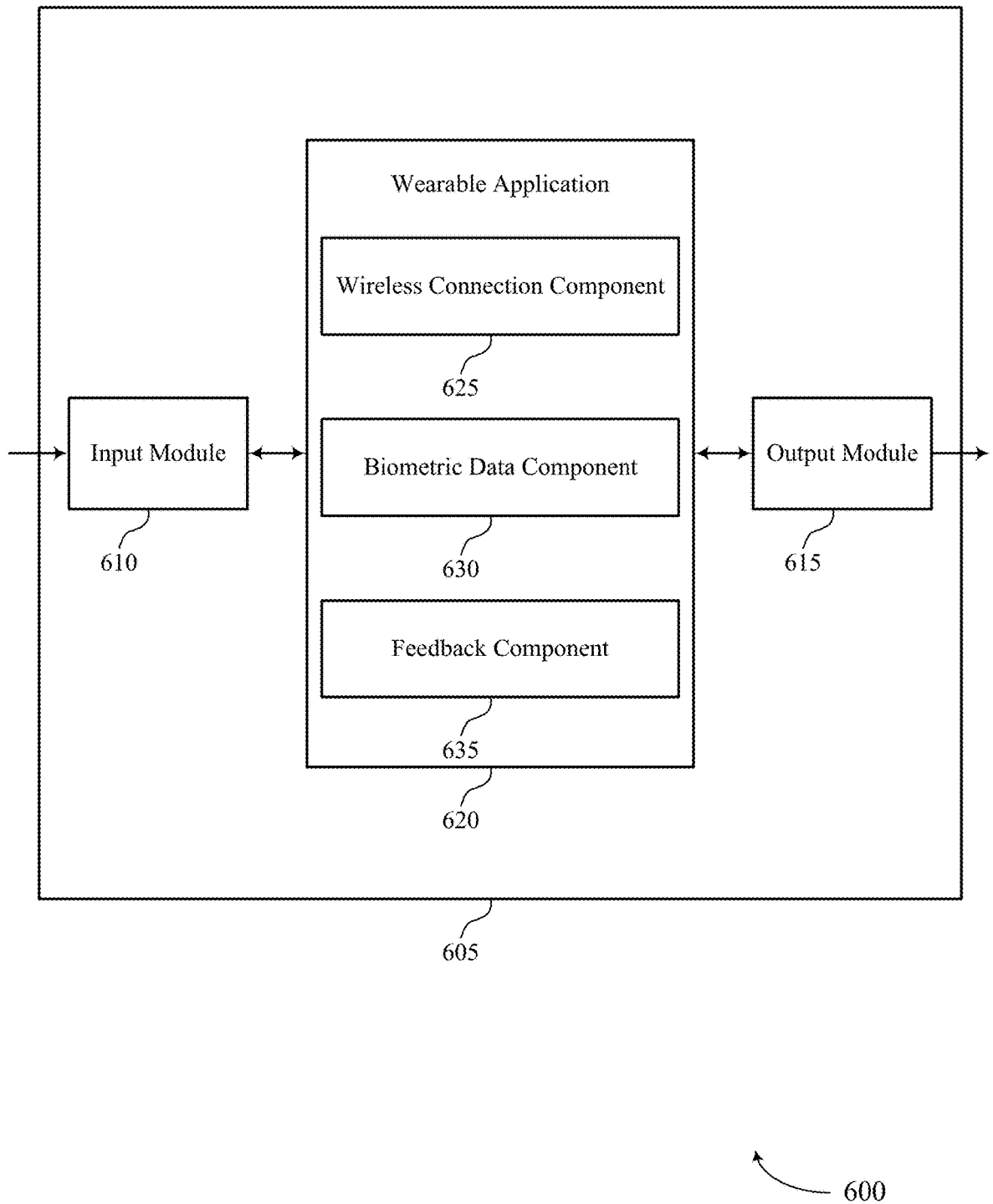
FIG. 6 shows a block diagram of an apparatus that supports using biometric data to provide feedback in an extended reality environment in accordance with aspects of the present disclosure.

FIG. 6 shows a block diagram 600 of a device 605 that supports using biometric data to provide feedback in an extended reality environment in accordance with aspects of the present disclosure. The device 605 may include an input module 610, an output module 615, and a wearable application 620. The device 605 may also include a processor. Each of these components may be in communication with one another (e.g., via one or more buses).

The input module 610 may provide a means for receiving information such as packets, user data, control information, or any combination thereof associated with various information channels (e.g., control channels, data channels, information channels related to illness detection techniques). Information may be passed on to other components of the device 605. The input module 610 may utilize a single antenna or a set of multiple antennas.

The output module 615 may provide a means for transmitting signals generated by other components of the device 605. For example, the output module 615 may transmit information such as packets, user data, control information, or any combination thereof associated with various information channels (e.g., control channels, data channels, information channels related to illness detection techniques). In some examples, the output module 615 may be co-located with the input module 610 in a transceiver module. The output module 615 may utilize a single antenna or a set of multiple antennas.

For example, the wearable application 620 may include a wireless connection component 625, a biometric data component 630, a feedback component 635, or any combination thereof. In some examples, the wearable application 620, or various components thereof, may be configured to perform various operations (e.g., receiving, monitoring, transmitting) using or otherwise in cooperation with the input module 610, the output module 615, or both. For example, the wearable application 620 may receive information from the input module 610, send information to the output module 615, or be integrated in combination with the input module 610, the output module 615, or both to receive information, transmit information, or perform various other operations as described herein.

The wearable application 620 may support providing feedback to a user in an extended reality environment in accordance with examples as disclosed herein. The wireless connection component 625 may be configured as or otherwise support a means for establishing a connection between a user device and an extended reality device. The biometric data component 630 may be configured as or otherwise support a means for acquiring a first set of biometric data from one or more sensors of a wearable device associated with a user. The feedback component 635 may be configured as or otherwise support a means for providing first feedback to the user via the extended reality device based at least in part on the first set of biometric data.

Figure 7:
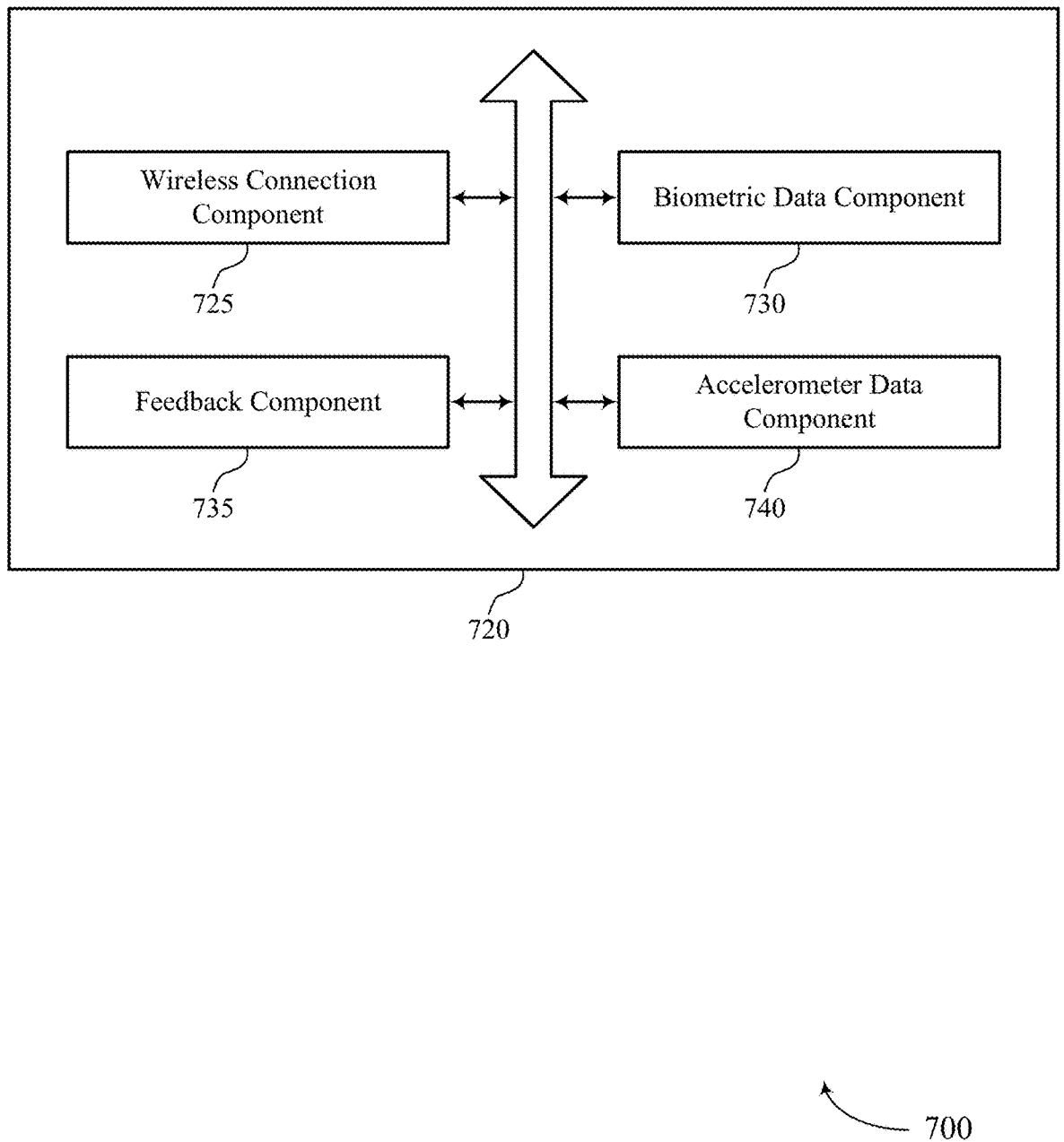
FIG. 7 shows a block diagram of a wearable application that supports using biometric data to provide feedback in an extended reality environment in accordance with aspects of the present disclosure.

FIG. 7 shows a block diagram 700 of a wearable application 720 that supports using biometric data to provide feedback in an extended reality environment in accordance with aspects of the present disclosure. The wearable application 720 may be an example of aspects of a wearable application or a wearable application 620, or both, as described herein. The wearable application 720, or various components thereof, may be an example of means for performing various aspects of using biometric data to provide feedback in an extended reality environment as described herein. For example, the wearable application 720 may include a wireless connection component 725, a biometric data component 730, a feedback component 735, an accelerometer data component 740, or any combination thereof. Each of these components may communicate, directly or indirectly, with one another (e.g., via one or more buses).

The wearable application 720 may support providing feedback to a user in an extended reality environment in accordance with examples as disclosed herein. The wireless connection component 725 may be configured as or otherwise support a means for establishing a connection between a user device and an extended reality device. The biometric data component 730 may be configured as or otherwise support a means for acquiring a first set of biometric data from one or more sensors of a wearable device associated with a user. The feedback component 735 may be configured as or otherwise support a means for providing first feedback to the user via the extended reality device based at least in part on the first set of biometric data.

In some examples, the biometric data component 730 may be configured as or otherwise support a means for transmitting an indication for the extended reality device to use the biometric data to update one or more visual aspects of the extended reality environment.

In some examples, the one or more visual aspects of the extended reality environment are configured to cause a parameter of the first biometric data to change in accordance with the first feedback.

In some examples, the accelerometer data component 740 may be configured as or otherwise support a means for acquiring accelerometer data from the one or more sensors of the wearable device, wherein providing the first feedback to the user comprises an indication for the user to refrain from moving.

In some examples, the biometric data component 730 may be configured as or otherwise support a means for acquiring a second set of biometric data from the one or more sensors of the wearable device based at least in part on a difference between the first set of biometric data and the second set of biometric data satisfying a threshold value.

In some examples, the feedback component 735 may be configured as or otherwise support a means for providing second feedback to the user via the extended reality device.

In some examples, the feedback component 735 may be configured as or otherwise support a means for providing, via the extended reality device, a reminder to the user comprising the first feedback.

In some examples, providing the first feedback is based at least in part on an engagement status of the user.

In some examples, the first feedback comprises one or more of visual feedback, audio feedback, haptic feedback, or any combination thereof.

In some examples, the feedback component 735 may be configured as or otherwise support a means for providing the first feedback to the user via the wearable device.

In some examples, the first feedback is provided periodically over a configurable duration.

In some examples, the extended reality device comprises a headset, glasses, or goggles.

In some examples, the wearable device comprises a finger ring wearable device or a wrist wearable device.

In some examples, the first set of biometric data comprises heart rate data, temperature data, stress data, blood oxygen data, blood glucose data, or a combination thereof.

Figure 8:
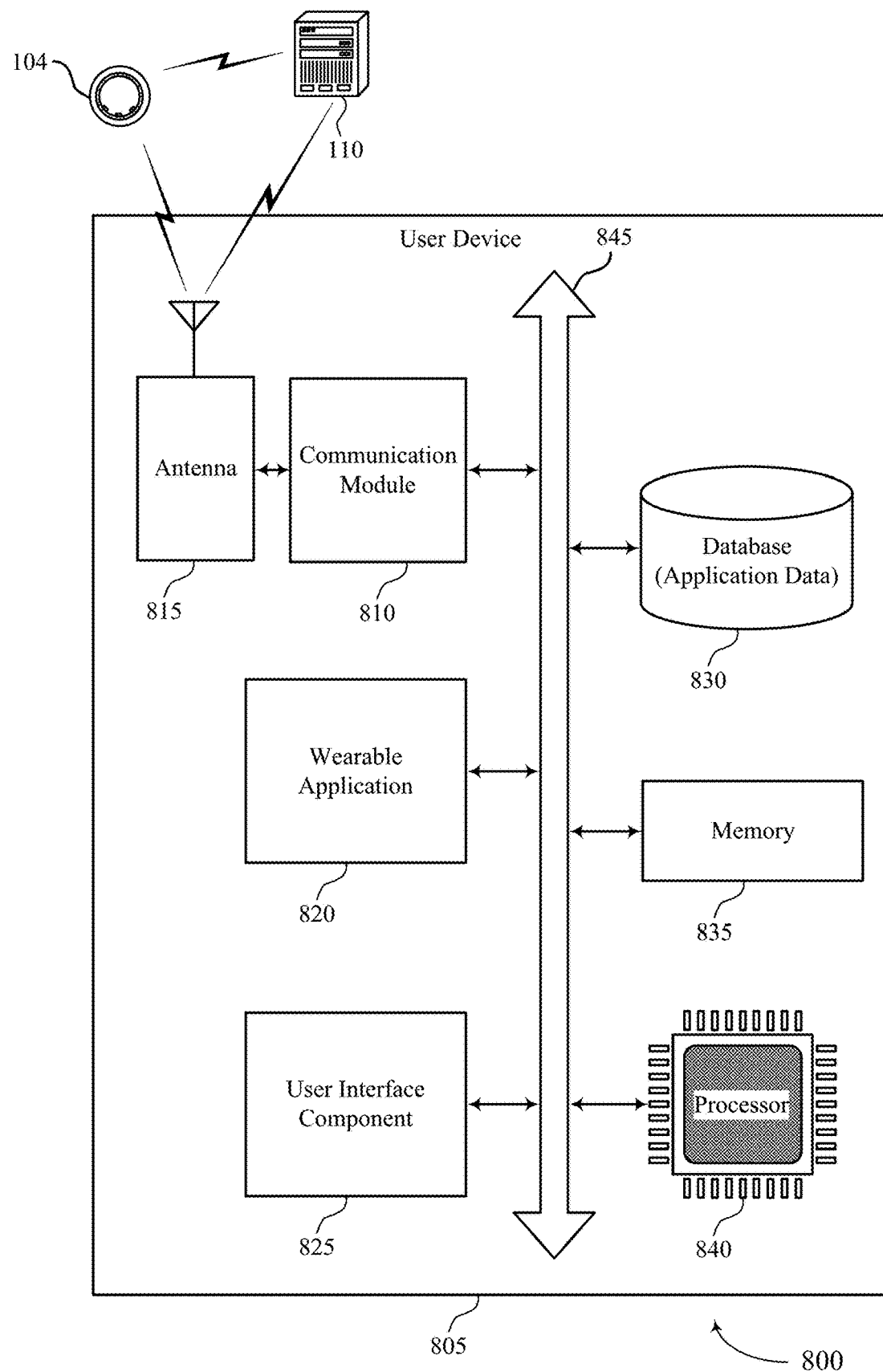
FIG. 8 shows a diagram of a system including a device that supports using biometric data to provide feedback in an extended reality environment in accordance with aspects of the present disclosure.

FIG. 8 shows a diagram of a system 800 including a device 805 that supports using biometric data to provide feedback in an extended reality environment in accordance with aspects of the present disclosure. The device 805 may be an example of or include the components of a device 605 as described herein. The device 805 may include an example of a user device 106, as described previously herein. The device 805 may include components for bi-directional communications including components for transmitting and receiving communications with a wearable device 104 and a server 110, such as a wearable application 820, a communication module 810, an antenna 815, a user interface component 825, a database (application data) 830, a memory 835, and a processor 840. These components may be in electronic communication or otherwise coupled (e.g., operatively, communicatively, functionally, electronically, electrically) via one or more buses (e.g., a bus 845).

The communication module 810 may manage input and output signals for the device 805 via the antenna 815. The communication module 810 may include an example of the communication module 220-b of the user device 106 shown and described in FIG. 2. In this regard, the communication module 810 may manage communications with the ring 104 and the server 110, as illustrated in FIG. 2. The communication module 810 may also manage peripherals not integrated into the device 805. In some cases, the communication module 810 may represent a physical connection or port to an external peripheral. In some cases, the communication module 810 may utilize an operating system such as iOS®, ANDROID®, MS-DOS®, MS-WINDOWS®, OS/2®, UNIX®, LINUX®, or another known operating system. In other cases, the communication module 810 may represent or interact with a wearable device (e.g., ring 104), modem, a keyboard, a mouse, a touchscreen, or a similar device. In some cases, the communication module 810 may be implemented as part of the processor 840. In some examples, a user may interact with the device 805 via the communication module 810, user interface component 825, or via hardware components controlled by the communication module 810.

In some cases, the device 805 may include a single antenna 815. However, in some other cases, the device 805 may have more than one antenna 815, which may be capable of concurrently transmitting or receiving multiple wireless transmissions. The communication module 810 may communicate bi-directionally, via the one or more antennas 815, wired, or wireless links as described herein. For example, the communication module 810 may represent a wireless transceiver and may communicate bi-directionally with another wireless transceiver. The communication module 810 may also include a modem to modulate the packets, to provide the modulated packets to one or more antennas 815 for transmission, and to demodulate packets received from the one or more antennas 815.

The user interface component 825 may manage data storage and processing in a database 830. In some cases, a user may interact with the user interface component 825. In other cases, the user interface component 825 may operate automatically without user interaction. The database 830 may be an example of a single database, a distributed database, multiple distributed databases, a data store, a data lake, or an emergency backup database.

The memory 835 may include RAM and ROM. The memory 835 may store computer-readable, computer-executable software including instructions that, when executed, cause the processor 840 to perform various functions described herein. In some cases, the memory 835 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory 835 to perform various functions (e.g., functions or tasks supporting a method and system for sleep staging algorithms).

The wearable application 820 may support providing feedback to a user in an extended reality environment in accordance with examples as disclosed herein. For example, the wearable application 820 may be configured as or otherwise support a means for establishing a connection between a user device and an extended reality device. The wearable application 820 may be configured as or otherwise support a means for acquiring a first set of biometric data from one or more sensors of a wearable device associated with a user. The wearable application 820 may be configured as or otherwise support a means for providing first feedback to the user via the extended reality device based at least in part on the first set of biometric data.

By including or configuring the wearable application 820 in accordance with examples as described herein, the device 805 may support techniques for an extended reality device to use biometric data to provide feedback to user in an extended reality environment, which may improve user experience by increasing the efficacy of an extended reality experience.

The wearable application 820 may include an application (e.g., "app"), program, software, or other component which is configured to facilitate communications with a ring 104, server 110, other user devices 106, and the like. For example, the wearable application 820 may include an application executable on a user device 106 which is configured to receive data (e.g., physiological data) from a ring 104, perform processing operations on the received data, transmit and receive data with the servers 110, and cause presentation of data to a user 102.

Figure 9:
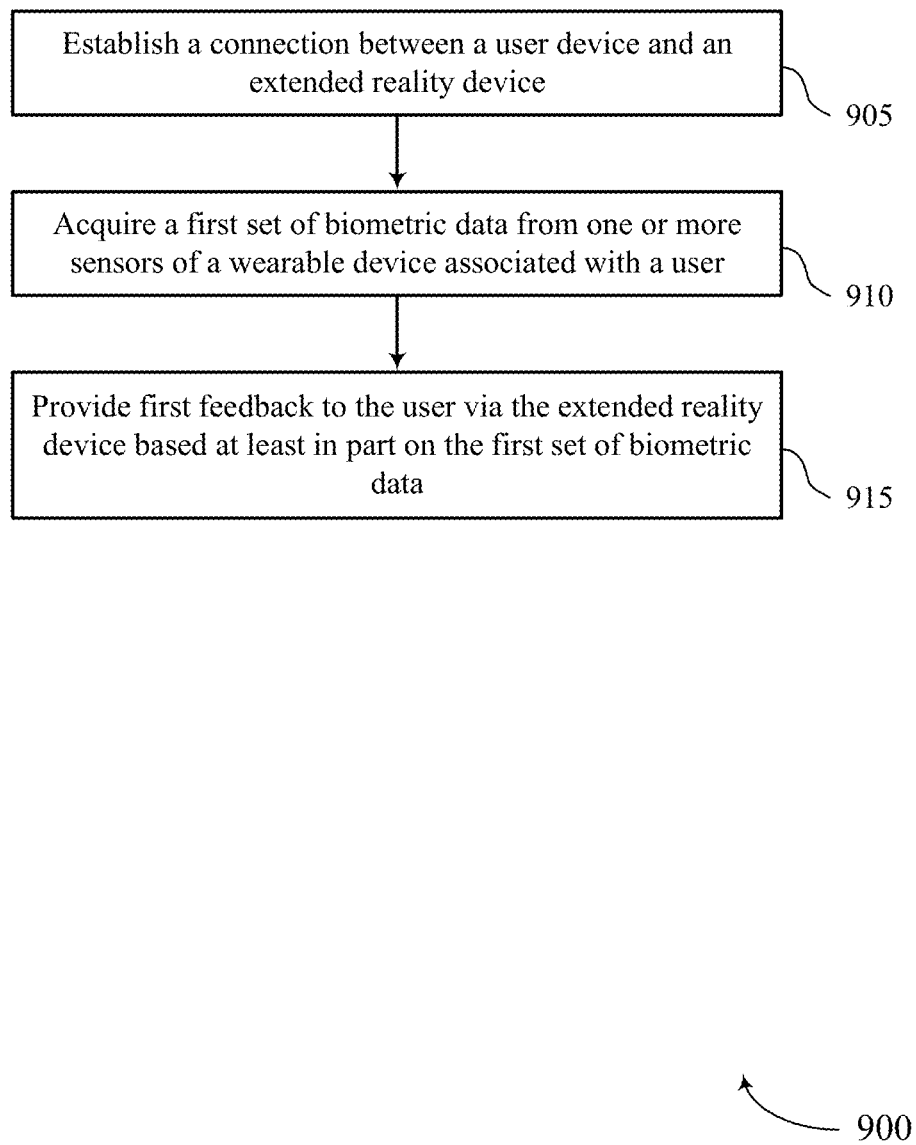
FIGS. 9 through 11 show flowcharts illustrating methods that support using biometric data to provide feedback in an extended reality environment in accordance with aspects of the present disclosure.

FIG. 9 shows a flowchart illustrating a method 900 that supports using biometric data to provide feedback in an extended reality environment in accordance with aspects of the present disclosure. The operations of the method 900 may be implemented by a user device or its components as described herein. For example, the operations of the method 900 may be performed by a user device as described with reference to FIGS. 1 through 8. In some examples, a user device may execute a set of instructions to control the functional elements of the user device to perform the described functions. Additionally, or alternatively, the user device may perform aspects of the described functions using special-purpose hardware.

At 905, the method may include establishing a connection between a user device and an extended reality device. The operations of block 905 may be performed in accordance with examples as disclosed herein. In some examples, aspects of the operations of 905 may be performed by a wireless connection component 725 as described with reference to FIG. 7.

At 910, the method may include acquiring a first set of biometric data from one or more sensors of a wearable device associated with a user. The operations of block 910 may be performed in accordance with examples as disclosed herein. In some examples, aspects of the operations of 910 may be performed by a biometric data component 730 as described with reference to FIG. 7.

At 915, the method may include providing first feedback to the user via the extended reality device based at least in part on the first set of biometric data. The operations of block 915 may be performed in accordance with examples as disclosed herein. In some examples, aspects of the operations of 915 may be performed by a feedback component 735 as described with reference to FIG. 7.

Figure 10:
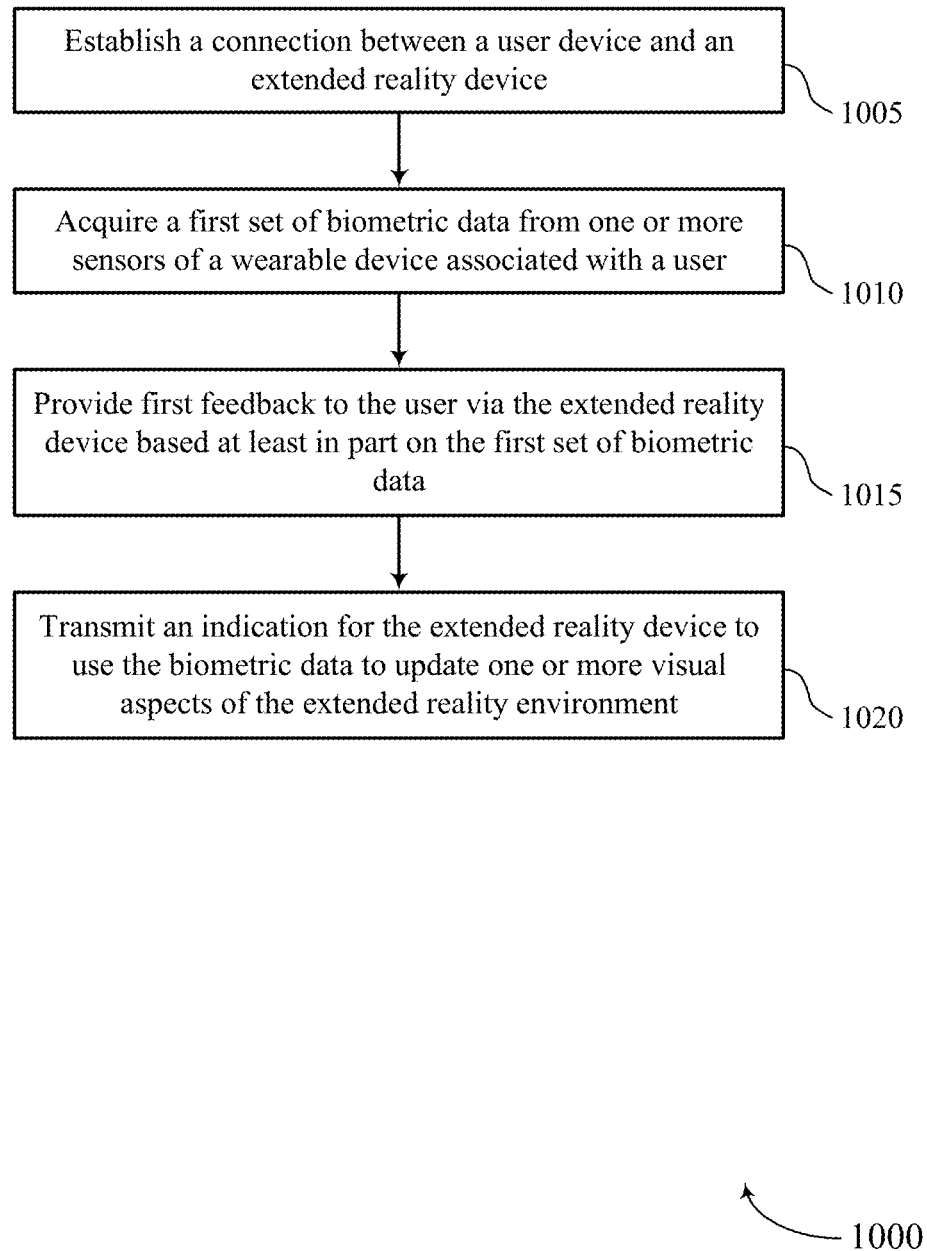

FIG. 10 shows a flowchart illustrating a method 1000 that supports using biometric data to provide feedback in an extended reality environment in accordance with aspects of the present disclosure. The operations of the method 1000 may be implemented by a user device or its components as described herein. For example, the operations of the method 1000 may be performed by a user device as described with reference to FIGS. 1 through 8. In some examples, a user device may execute a set of instructions to control the functional elements of the user device to perform the described functions. Additionally, or alternatively, the user device may perform aspects of the described functions using special-purpose hardware.

At 1005, the method may include establishing a connection between a user device and an extended reality device. The operations of block 1005 may be performed in accordance with examples as disclosed herein. In some examples, aspects of the operations of 1005 may be performed by a wireless connection component 725 as described with reference to FIG. 7.

At 1010, the method may include acquiring a first set of biometric data from one or more sensors of a wearable device associated with a user. The operations of block 1010 may be performed in accordance with examples as disclosed herein. In some examples, aspects of the operations of 1010 may be performed by a biometric data component 730 as described with reference to FIG. 7.

At 1015, the method may include providing first feedback to the user via the extended reality device based at least in part on the first set of biometric data. The operations of block 1015 may be performed in accordance with examples as disclosed herein. In some examples, aspects of the operations of 1015 may be performed by a feedback component 735 as described with reference to FIG. 7.

At 1020, the method may include transmitting an indication for the extended reality device to use the biometric data to update one or more visual aspects of the extended reality environment. The operations of block 1020 may be performed in accordance with examples as disclosed herein. In some examples, aspects of the operations of 1020 may be performed by a biometric data component 730 as described with reference to FIG. 7.

Figure 11:
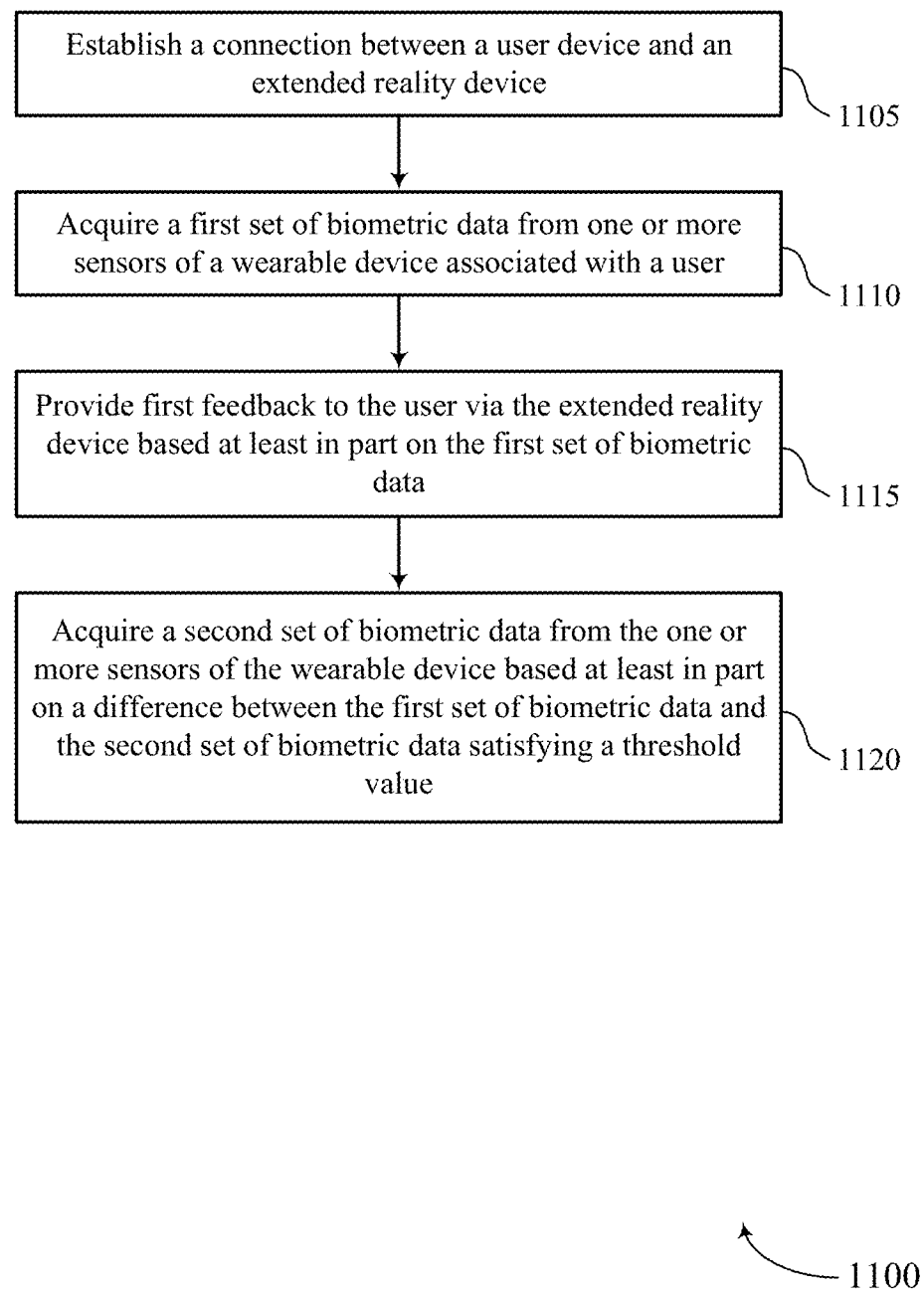

FIG. 11 shows a flowchart illustrating a method 1100 that supports using biometric data to provide feedback in an extended reality environment in accordance with aspects of the present disclosure. The operations of the method 1100 may be implemented by a user device or its components as described herein. For example, the operations of the method 1100 may be performed by a user device as described with reference to FIGS. 1 through 8. In some examples, a user device may execute a set of instructions to control the functional elements of the user device to perform the described functions. Additionally, or alternatively, the user device may perform aspects of the described functions using special-purpose hardware.

At 1105, the method may include establishing a connection between a user device and an extended reality device. The operations of block 1105 may be performed in accordance with examples as disclosed herein. In some examples, aspects of the operations of 1105 may be performed by a wireless connection component 725 as described with reference to FIG. 7.

At 1110, the method may include acquiring a first set of biometric data from one or more sensors of a wearable device associated with a user. The operations of block 1110 may be performed in accordance with examples as disclosed herein. In some examples, aspects of the operations of 1110 may be performed by a biometric data component 730 as described with reference to FIG. 7.

At 1115, the method may include providing first feedback to the user via the extended reality device based at least in part on the first set of biometric data. The operations of block 1115 may be performed in accordance with examples as disclosed herein. In some examples, aspects of the operations of 1115 may be performed by a feedback component 735 as described with reference to FIG. 7.

At 1120, the method may include acquiring a second set of biometric data from the one or more sensors of the wearable device based at least in part on a difference between the first set of biometric data and the second set of biometric data satisfying a threshold value. The operations of block 1120 may be performed in accordance with examples as disclosed herein. In some examples, aspects of the operations of 1120 may be performed by a biometric data component 730 as described with reference to FIG. 7.

It should be noted that the methods described above describe possible implementations, and that the operations and the steps may be rearranged or otherwise modified and that other implementations are possible. Furthermore, aspects from two or more of the methods may be combined.

A method for providing feedback to a user in an extended reality environment is described. The method may include establishing a connection between a user device and an extended reality device, acquiring a first set of biometric data from one or more sensors of a wearable device associated with a user, and providing first feedback to the user via the extended reality device based at least in part on the first set of biometric data.

An apparatus for providing feedback to a user in an extended reality environment is described. The apparatus may include a processor, memory coupled with the processor, and instructions stored in the memory. The instructions may be executable by the processor to cause the apparatus to establish a connection between a user device and an extended reality device, acquire a first set of biometric data from one or more sensors of a wearable device associated with a user, and provide first feedback to the user via the extended reality device based at least in part on the first set of biometric data.

Another apparatus for providing feedback to a user in an extended reality environment is described. The apparatus may include means for establishing a connection between a user device and an extended reality device, means for acquiring a first set of biometric data from one or more sensors of a wearable device associated with a user, and means for providing first feedback to the user via the extended reality device based at least in part on the first set of biometric data.

A non-transitory computer-readable medium storing code for providing feedback to a user in an extended reality environment is described. The code may include instructions executable by a processor to establish a connection between a user device and an extended reality device, acquire a first set of biometric data from one or more sensors of a wearable device associated with a user, and provide first feedback to the user via the extended reality device based at least in part on the first set of biometric data.

Some examples of the method, apparatuses, and non-transitory computer-readable medium described herein may further include operations, features, means, or instructions for transmitting an indication for the extended reality device to use the biometric data to update one or more visual aspects of the extended reality environment.

In some examples of the method, apparatuses, and non-transitory computer-readable medium described herein, the one or more visual aspects of the extended reality environment may be configured to cause a parameter of the first biometric data to change in accordance with the first feedback.

Some examples of the method, apparatuses, and non-transitory computer-readable medium described herein may further include operations, features, means, or instructions for acquiring accelerometer data from the one or more sensors of the wearable device, wherein providing the first feedback to the user comprises an indication for the user to refrain from moving.

Some examples of the method, apparatuses, and non-transitory computer-readable medium described herein may further include operations, features, means, or instructions for acquiring a second set of biometric data from the one or more sensors of the wearable device based at least in part on a difference between the first set of biometric data and the second set of biometric data satisfying a threshold value.

Some examples of the method, apparatuses, and non-transitory computer-readable medium described herein may further include operations, features, means, or instructions for providing second feedback to the user via the extended reality device.

In some examples of the method, apparatuses, and non-transitory computer-readable medium described herein, providing, via the extended reality device, a reminder to the user comprising the first feedback.

Some examples of the method, apparatuses, and non-transitory computer-readable medium described herein may further include operations, features, means, or instructions for providing the first feedback may be based at least in part on an engagement status of the user.

In some examples of the method, apparatuses, and non-transitory computer-readable medium described herein, the first feedback comprises one or more of visual feedback, audio feedback, haptic feedback, or any combination thereof.

Some examples of the method, apparatuses, and non-transitory computer-readable medium described herein may further include operations, features, means, or instructions for providing the first feedback to the user via the wearable device.

In some examples of the method, apparatuses, and non-transitory computer-readable medium described herein, the first feedback may be provided periodically over a configurable duration.

In some examples of the method, apparatuses, and non-transitory computer-readable medium described herein, the extended reality device comprises a headset, glasses, or goggles.

In some examples of the method, apparatuses, and non-transitory computer-readable medium described herein, the wearable device comprises a finger ring wearable device or a wrist wearable device.

In some examples of the method, apparatuses, and non-transitory computer-readable medium described herein, the first set of biometric data comprises heart rate data, temperature data, stress data, blood oxygen data, blood glucose data, or a combination thereof.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD)

ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for providing feedback to a user in an extended reality environment, comprising:
    establishing a connection between a user device and an extended reality device;
    acquiring a first set of biometric data from one or more sensors of a wearable device associated with a user;
    identifying an engagement status of the user based at least in part on a comparison of the first set of biometric data and one or more biometric thresholds configured for identifying engagement of the user in the extended reality environment;
    providing, via a first feedback occasion, feedback to the user via the extended reality device to modify the engagement status of the user;
    identifying one or more trends associated with responses of the user to the feedback provided via a plurality of subsequent feedback occasions, wherein the one or more trends are based at least in part on a second set of biometric data acquired after each feedback occasion of the plurality of subsequent feedback occasions, wherein the one or more trends comprise a heart rate trend, a respiration rate trend, a temperature trend, a movement trend, or any combination thereof; and
    updating one or more characteristics of the feedback provided to the user via the extended reality device based at least in part on the one or more trends.

2. The method of claim 1, further comprising:
    transmitting an indication for the extended reality device to use the first set of biometric data to update one or more visual aspects of the extended reality environment.

3. The method of claim 2, wherein the one or more visual aspects of the extended reality environment are configured to cause a parameter of the first set of biometric data to change in accordance with the feedback.

4. The method of claim 1, further comprising:
    acquiring movement data from the one or more sensors of the wearable device, wherein providing the feedback to the user comprises an indication for the user to refrain from moving.

5. The method of claim 1, further comprising:
    acquiring a second set of biometric data from the one or more sensors of the wearable device based at least in part on a difference between the first set of biometric data and the second set of biometric data satisfying a threshold value.

6. The method of claim 5, further comprising:
    providing the updated feedback to the user via the extended reality device.

7. The method of claim 5, further comprising:
    providing, via the extended reality device during a second feedback occasion of the plurality of subsequent feedback occasions, a reminder to the user comprising the feedback.

8. The method of claim 1, wherein the one or more biometric thresholds comprises a motion threshold, a heart rate threshold, or both.

9. The method of claim 1, wherein the feedback comprises one or more of visual feedback, audio feedback, haptic feedback, or any combination thereof.

10. The method of claim 1, further comprising:
    providing the feedback to the user via the wearable device.

11. The method of claim 1, wherein the feedback is provided periodically over the plurality of subsequent feedback occasions during a configurable duration.

12. The method of claim 1, wherein the extended reality device comprises a headset, glasses, or goggles.

13. The method of claim 1, wherein the wearable device comprises a finger ring wearable device or a wrist wearable device.

14. The method of claim 1, wherein the first set of biometric data comprises heart rate data, temperature data, respiration rate data, stress data, blood oxygen data, blood glucose data, or a combination thereof.

15. The method of claim 1, wherein updating the one or more characteristics of the feedback is based at least in part on the one or more trends relative to one or more second biometric thresholds.

16. The method of claim 1, wherein updating the one or more characteristics of the feedback comprises:
    adjusting an intensity of the feedback provided to the user via the extended reality device based at least in part on the one or more trends.

17. An apparatus for providing feedback to a user in an extended reality environment, comprising:
    one or more processors;
    one or more memories coupled with the one or more processors; and
    instructions stored in the one or more memories and executable by the one or more processors to cause the apparatus to:
        establish a connection between a user device and an extended reality device;
        acquire a first set of biometric data from one or more sensors of a wearable device associated with a user;
        identify an engagement status of the user based at least in part on a comparison of the first set of biometric data and one or more biometric thresholds configured for identifying engagement of the user in the extended reality environment;

provide, via a first feedback occasion, feedback to the user via the extended reality device to modify the engagement status of the user;

identify one or more trends associated with responses of the user to the feedback provided via a plurality of subsequent feedback occasions, wherein the one or more trends are based at least in part on a second set of biometric data acquired after each feedback occasion of the plurality of subsequent feedback occasions, wherein the one or more trends comprise a heart rate trend, a respiration rate trend, a temperature trend, a movement trend, or any combination thereof; and update one or more characteristics of the feedback provided to the user via the extended reality device based at least in part on the one or more trends.

18. The apparatus of claim 17, wherein the instructions are further executable by the one or more processors to cause the apparatus to:

transmit an indication for the extended reality device to use the first set of biometric data to update one or more visual aspects of the extended reality environment.

19. The apparatus of claim 17, wherein the instructions are further executable by the one or more processors to cause the apparatus to:

acquire movement data from the one or more sensors of the wearable device, wherein providing the feedback to the user comprises an indication for the user to refrain from moving.

20. A non-transitory computer-readable medium storing code for providing feedback to a user in an extended reality environment, the code comprising instructions executable by one or more processors to:

establish a connection between a user device and an extended reality device;

acquire a first set of biometric data from one or more sensors of a wearable device associated with a user;

identify an engagement status of the user based at least in part on a comparison of the first set of biometric data and one or more biometric thresholds configured for identifying engagement of the user in the extended reality environment;

provide, via a first feedback occasion, feedback to the user via the extended reality device to modify the engagement status of the user;

identify one or more trends associated with responses of the user to the feedback provided via a plurality of subsequent feedback occasions, wherein the one or more trends are based at least in part on a second set of biometric data acquired after each feedback occasion of the plurality of subsequent feedback occasions, wherein the one or more trends comprise a heart rate trend, a respiration rate trend, a temperature trend, a movement trend, or any combination thereof; and update one or more characteristics of the feedback provided to the user via the extended reality device based at least in part on the one or more trends.

* * * * *